United States Patent [19]
Tanaka et al.

[11] Patent Number: 5,442,731
[45] Date of Patent: * Aug. 15, 1995

[54] INFERENCE PLANNING SYSTEM

[75] Inventors: Masayuki Tanaka, Takatsuki; Hirokazu Kominami, Toyonaka, both of Japan

[73] Assignee: Matsushita Electric Industrial Co., Ltd., Kadoma, Japan

[*] Notice: The portion of the term of this patent subsequent to Jun. 14, 2011 has been disclaimed.

[21] Appl. No.: 194,339

[22] Filed: Feb. 8, 1994

Related U.S. Application Data

[60] Division of Ser. No. 116,730, Sep. 7, 1993, Pat. No. 5,321,620, which is a continuation of Ser. No. 356,302, May 24, 1989, abandoned.

[30] Foreign Application Priority Data

May 25, 1988 [JP] Japan ................. 63-127721
Dec. 1, 1988 [JP] Japan ................. 63-304897

[51] Int. Cl.$^6$ ........................................ G06F 15/00
[52] U.S. Cl. ........................... 395/54; 395/919; 395/50
[58] Field of Search .............. 395/919, 54, 50

[56] References Cited

U.S. PATENT DOCUMENTS

| | | | |
|---|---|---|---|
| 4,628,434 | 12/1986 | Tashiro et al. | 364/130 |
| 4,628,435 | 12/1986 | Tashiro et al. | 364/130 |
| 4,700,317 | 10/1987 | Watanabe et al. | 364/488 |
| 4,835,709 | 5/1989 | Tsai | 364/513 |
| 4,870,591 | 9/1989 | Cicciarelli et al. | 364/468 |
| 4,901,229 | 2/1990 | Tashiro et al. | 364/200 |

FOREIGN PATENT DOCUMENTS

| | | |
|---|---|---|
| 0153747 | 9/1985 | European Pat. Off. |
| 2126762 | 3/1984 | United Kingdom |
| 2136174 | 9/1984 | United Kingdom |
| 2139787 | 11/1984 | United Kingdom |
| 2145256 | 3/1985 | United Kingdom |
| 2206713 | 1/1989 | United Kingdom |
| 86/00735 | 1/1986 | WIPO |

OTHER PUBLICATIONS

Ardayfio et al., "Prototype Expert Systems for Engineering Design and Manufacturing Automation", Received Jan. 1987.
Gelsey et al., "Automated Reasoning about Machine Geometry and Kinetics"; Proc. 3rd. Conf. on AI Applications; Feb. 1987; pp. 182–187.
Bond et al. "Integrating Prolog and CADAM to Produce an Intelligent CAD System"; WESTEX-87 Proc. West. Conf. on Expert Systems pp. 152–160, 1987.
Kohiyama, "Automated Production System Introduced in Fujisawa Factory", Fujisawa Factory, Japan IBM Company, 1986, pp. 1–23.
Zemel et al., DISPATCHER: "An Intelligent Approach to Factory Control"; Oct. 1988.
Kerr et al. "Implementation of an Expert System for Production Scheduling"; European Journal of Operational Research 33 (1988) 17–29.
Kanet et al., "Expert Systems in Production Scheduling"; European Journal of Operational Research 29 (1987) 51–59.
Lee et al., "PAMS: A Domain-specific Knowledge-based Parallel Machine Scheduling System"; Expert Systems; Aug. 1988, vol. 5, No. 3, pp. 198–214.
Jared; "Feature Recognition & Expert Systems for Operation Planning in NC Machining"; AI & Advanced Computer Tech. Conf.; Sep. 1986.

*Primary Examiner*—Robert W. Downs
*Attorney, Agent, or Firm*—Cushman, Darby & Cushman

[57] ABSTRACT

Data for production planning is input by an input device 3 and stored in a data base 1 for planning. Knowledge for planning is also input by the input device 3 and stored in a knowledge base 2 for planning. An inference engine 6 automatically makes and modifies the production plan. The plan made by the inference engine 6 is stored in a data base 17 of inference result. An intelligent editor 15 makes a plan free of inconsistencies through the input device 3. The Inference result of planning of the intelligent editor is also stored in the data base 17 of inference result. Data in the data base 1 and in the data base 17 of inference result is either indicated on a display 16 or printed on paper by a printer 22. As a result, it is possible to make a reliable plan and realize planning having wide extent of utilization.

7 Claims, 40 Drawing Sheets

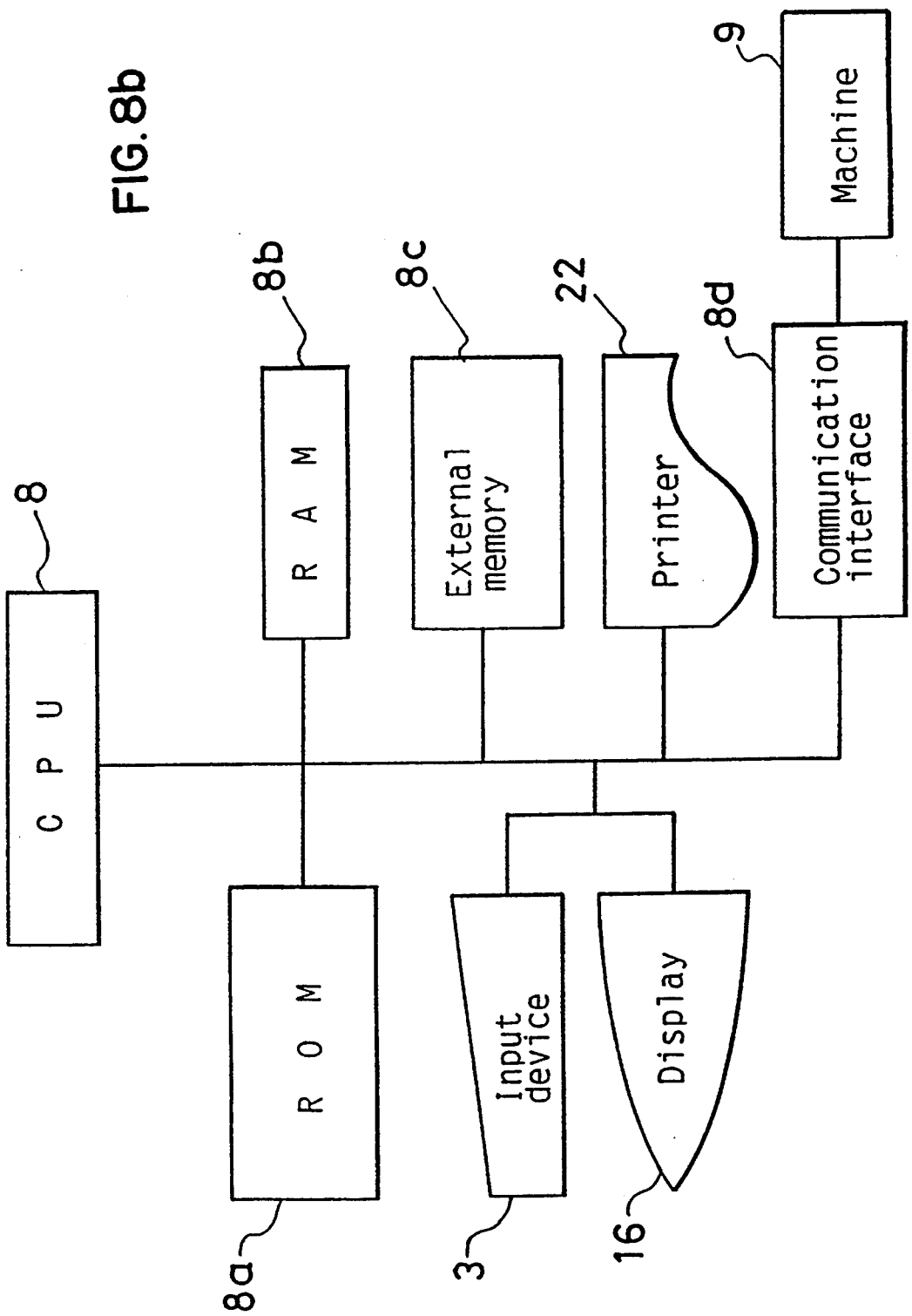

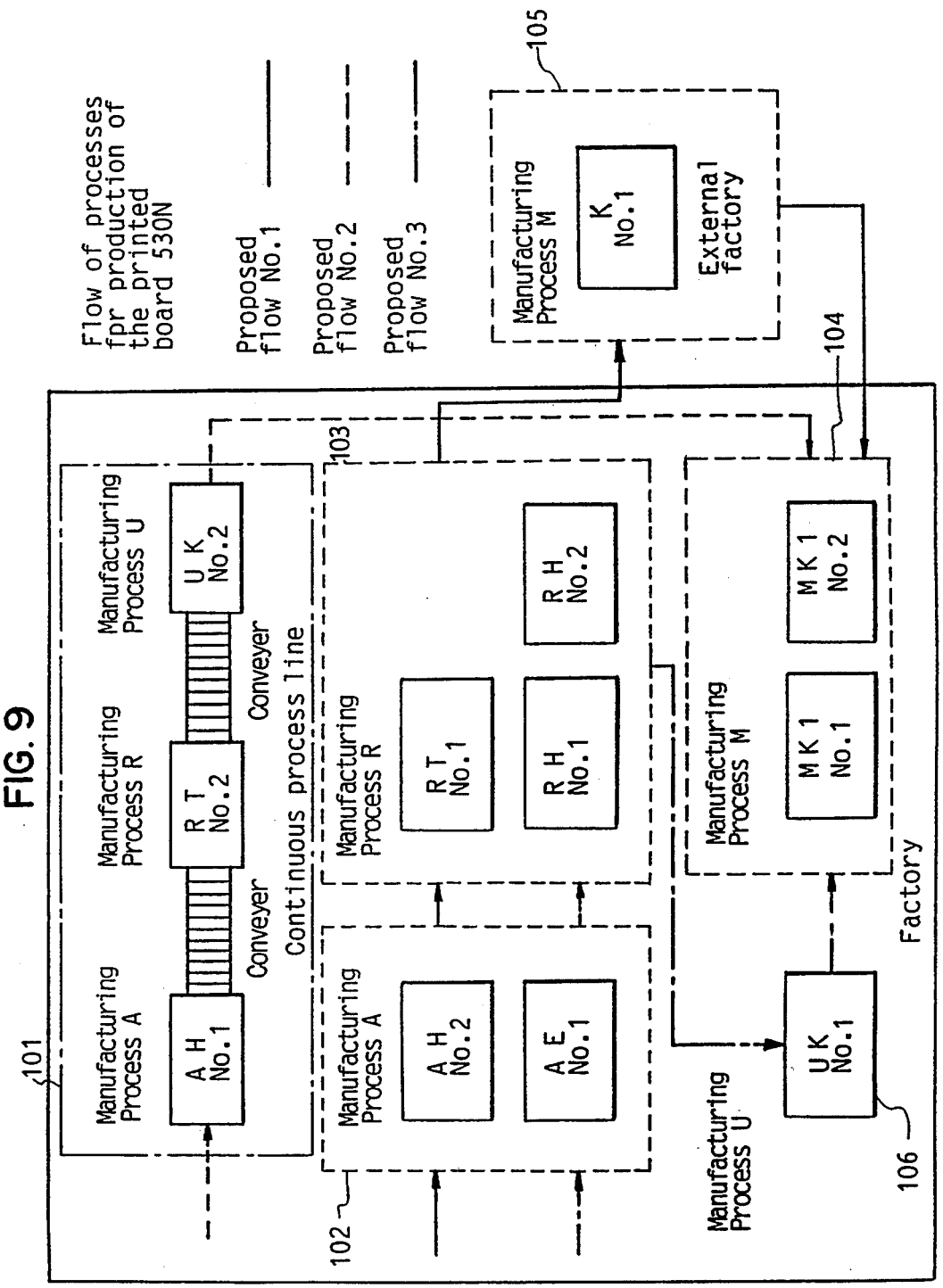

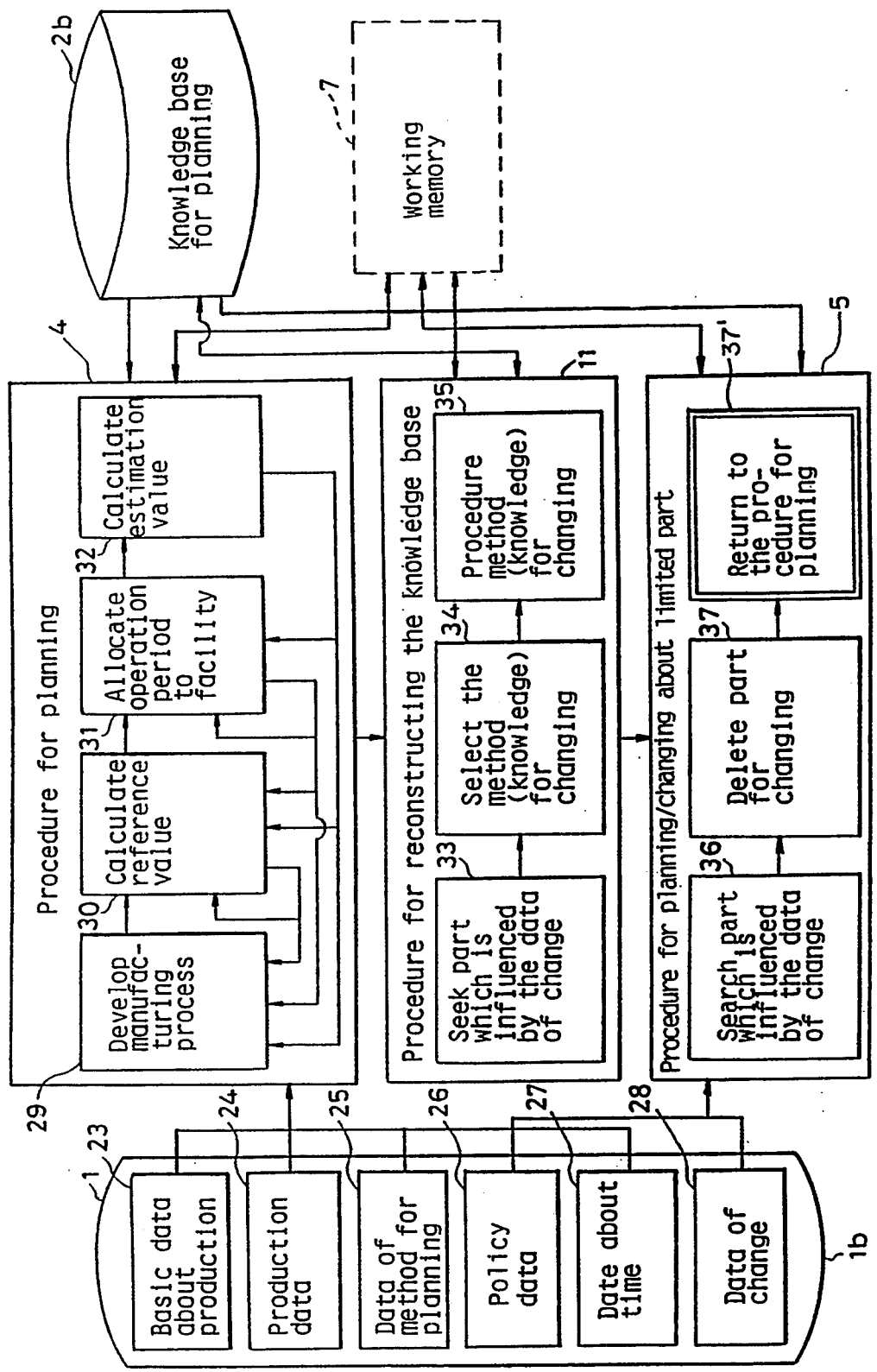

FIG. 11

PAGE 1   * Specification of schedule ( Capacity of basic schedule ) *

| NO | Name of facility | Capacity of facility [Item/Hr] | Loading period [sec] |
|----|------------------|-------------------------------|----------------------|
| 1  | AH               | 7200                          | 5                    |
| 2  | AE               | 2769                          | 5                    |
| 3  | RT               | 2769                          | 5                    |
| 4  | RH               | 5143                          | 5                    |
| 5  | MK               | 1028                          | 3                    |
| 6  | D                | 1028                          | 3                    |
| 7  | *END*            |                               |                      |
| 8  |                  |                               |                      |
| 9  |                  |                               |                      |
| 10 |                  |                               |                      |
| 11 |                  |                               |                      |
| 12 |                  |                               |                      |
| 13 |                  |                               |                      |
| 14 |                  |                               |                      |
| 15 |                  |                               |                      |

| PF1 | PF2 | PF3 | PF4 | PF5 | PF6 | PF7 | PF8 | PF9 | PF10 |
|-----|-----|-----|-----|-----|-----|-----|-----|-----|------|
| Set | Following screen | Delete | Insert | | | | | | End |

FIG. 12

PAGE 1     * Specification of schedule ( [Change of basic schedule] ) *
                 ( F = A: Add, V: Change, D: Delete )

| NO | F | Type of product | No. of lot | Quantity in lot | Time (date) for start | | | Time (date) for completion | | | Type of finished product | No. of lot for product |
|---|---|---|---|---|---|---|---|---|---|---|---|---|
| | | | | | Year | Month | Day | Year | Month | Day | | |
| 1 | A | 530N | 1 | 1650 | 88 | 7 | 01 | 88 | 7 | 04 | | |
| 2 | A | 535N | 2 | 740 | 88 | 7 | 01 | 88 | 7 | 04 | | |
| 3 | A | 530N | 3 | 1760 | 88 | 7 | 02 | 88 | 7 | 05 | | |
| 4 | A | 535N | 4 | 750 | 88 | 7 | 02 | 88 | 7 | 05 | | |
| 5 | A | 530N | 5 | 1650 | 88 | 7 | 03 | 88 | 7 | 06 | | |
| 6 | A | 529N | 6 | 770 | 88 | 7 | 03 | 88 | 7 | 06 | | |
| 7 | A | 530N | 7 | 1980 | 88 | 7 | 04 | 88 | 7 | 07 | | |
| 8 | A | 532N | 8 | 180 | 88 | 7 | 04 | 88 | 7 | 07 | | |
| 9 | A | 529N | 9 | 1120 | 88 | 7 | 04 | 88 | 7 | 07 | | |
| 10 | A | 532N | 10 | 1760 | 88 | 7 | 05 | 88 | 7 | 08 | | |
| 11 | A | 529N | 11 | 975 | 88 | 7 | 05 | 88 | 7 | 08 | | |
| 12 | A | 531N | 12 | 240 | 88 | 7 | 05 | 88 | 7 | 08 | | |
| 13 | A | 532N | 13 | 60 | 88 | 7 | 06 | 88 | 7 | 09 | | |
| 14 | A | 530N | 14 | 2050 | 88 | 7 | 06 | 88 | 7 | 09 | | |
| 15 | A | 531N | 15 | 1060 | 88 | 7 | 06 | 88 | 7 | 09 | | |

| PF1 | PF2 | PF3 | PF4 | PF5 | PF6 | PF7 | PF8 | PF9 | PF10 |
|---|---|---|---|---|---|---|---|---|---|
| Set | Following screen | Delete | Insert | | | | | | End |

FIG. 13

PAGE 1   * Specification of schedule ( Daily period of facility operation ) *

| NO | Date | | | Day of the week | Period of operation [hours] |
|----|------|--|--|-----------------|------------------------------|
|    | Year | Month | Day | | |
| 1  | 88 | 7 | 1  | Monday    | 716 |
| 2  | 88 | 7 | 2  | Tuesday   | 716 |
| 3  | 88 | 7 | 3  | Wednesday | 716 |
| 4  | 88 | 7 | 4  | Thursday  | 716 |
| 5  | 88 | 7 | 5  | Friday    | 716 |
| 6  | 88 | 7 | 6  | Saturday  | 716 |
| 7  | 88 | 7 | 7  | Sunday    | 716 |
| 8  | 88 | 7 | 8  | Monday    | 716 |
| 9  | 88 | 7 | 9  | Tuesday   | 716 |
| 10 | 88 | 7 | 10 | Wednesday | 716 |
| 11 | 88 | 7 | 11 | Thursday  | 716 |
| 12 | 88 | 7 | 12 | Friday    | 716 |
| 13 | 88 | 7 | 13 | Saturday  | 716 |
| 14 | 88 | 7 | 14 | Sunday    | 716 |
| 15 | 88 | 7 | 15 | Monday    | 716 |

PF1 Set | PF2 Following screen | PF3 Delete | PF4 Insert | PF5 | PF6 | PF7 | PF8 | PF9 | PF10 End

FIG. 14

PAGE 1   * Specification of schedule ( Set period for disenabling operation of facility ) *
( In case name of facility or index name of facility is blank,
names of all facilities are supported to be inputted.)

| NO | Name of facility or index name of facility | Year | Month | Day | Time for start | Time for completion |
|----|--------------------------------------------|------|-------|-----|----------------|---------------------|
| 1  | FH                                         | 88   | 7     | 12  | 300            | 400                 |
| 2  | MK                                         | 88   | 7     | 13  | 100            | 200                 |
| 3  |                                            | 88   | 7     | 14  | 0              | 100                 |
| 4  | *END*                                      |      |       |     |                |                     |
| 5  |                                            |      |       |     |                |                     |
| 6  |                                            |      |       |     |                |                     |
| 7  |                                            |      |       |     |                |                     |
| 8  |                                            |      |       |     |                |                     |
| 9  |                                            |      |       |     |                |                     |
| 10 |                                            |      |       |     |                |                     |
| 11 |                                            |      |       |     |                |                     |
| 12 |                                            |      |       |     |                |                     |
| 13 |                                            |      |       |     |                |                     |
| 14 |                                            |      |       |     |                |                     |
| 15 |                                            |      |       |     |                |                     |

| PF1 | PF2 | PF3 | PF4 | PF5 | PF6 | PF7 | PF8 | PF9 | PF10 |
|-----|-----|-----|-----|-----|-----|-----|-----|-----|------|
| Set | Following screen | Delete | Insert |  |  |  |  |  | End |

FIG. 15

PAGE 1   * Specification of schedule ( Result of production ) *

| NO | Date of production | | No. of lot | No. of manufacturing process | No. of division | Quantity of production |
|----|------|-----|-----|-----|-----|-----|
| | Year | Month | Day | | | | |
| 1 | 88 | 7 | 2 | 1 | 1 | 1 | 100 |
| 2 | | | | 1 | 2 | 1 | 80 |
| 3 | | | | 1 | 3 | 1 | 50 |
| 4 | | | | 2 | 1 | 1 | 120 |
| 5 | | | | 2 | 2 | 1 | 100 |
| 6 | | | | 2 | 3 | 1 | 80 |
| 7 | | | | 2 | 4 | 1 | 50 |
| 8 | *END* | | | | | | |
| 9 | | | | | | | |
| 10 | | | | | | | |
| 11 | | | | | | | |
| 12 | | | | | | | |
| 13 | | | | | | | |
| 14 | | | | | | | |
| 15 | | | | | | | |

| PF1 | PF2 | PF3 | PF4 | PF5 | PF6 | PF7 | PF8 | PF9 | PF10 |
|-----|-----|-----|-----|-----|-----|-----|-----|-----|------|
| Set | Following screen | Delete | Insert | | | | | | End |

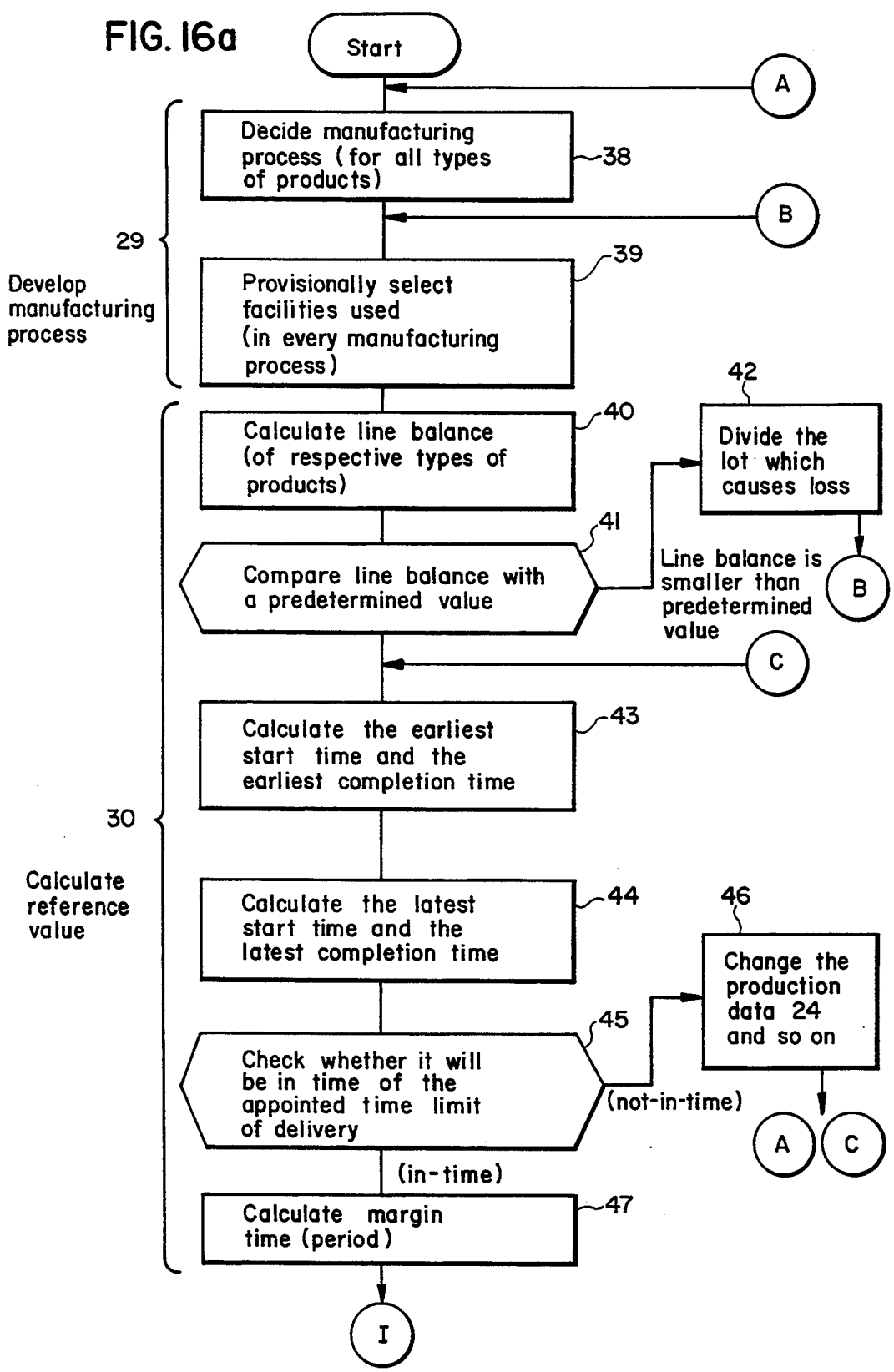

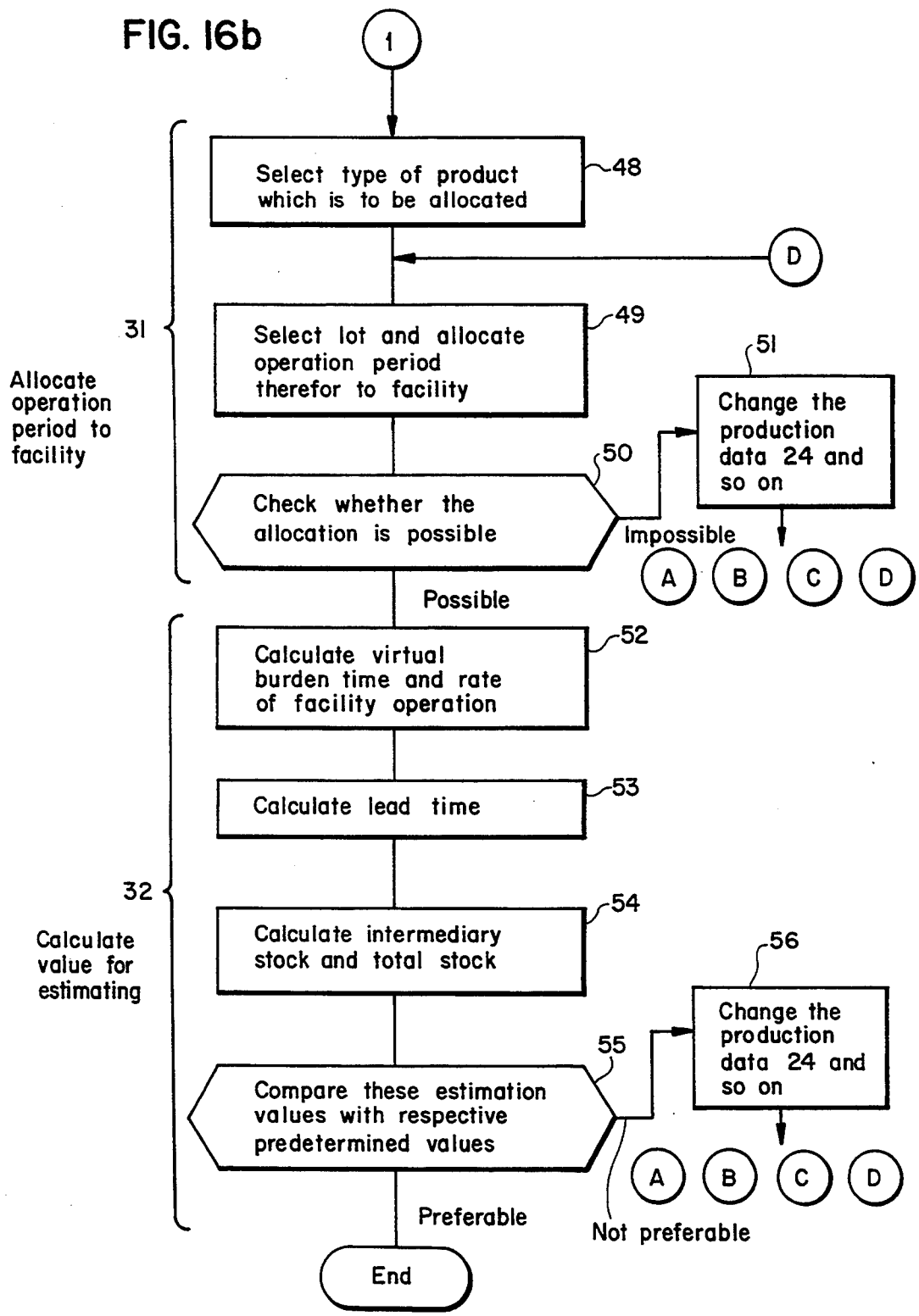

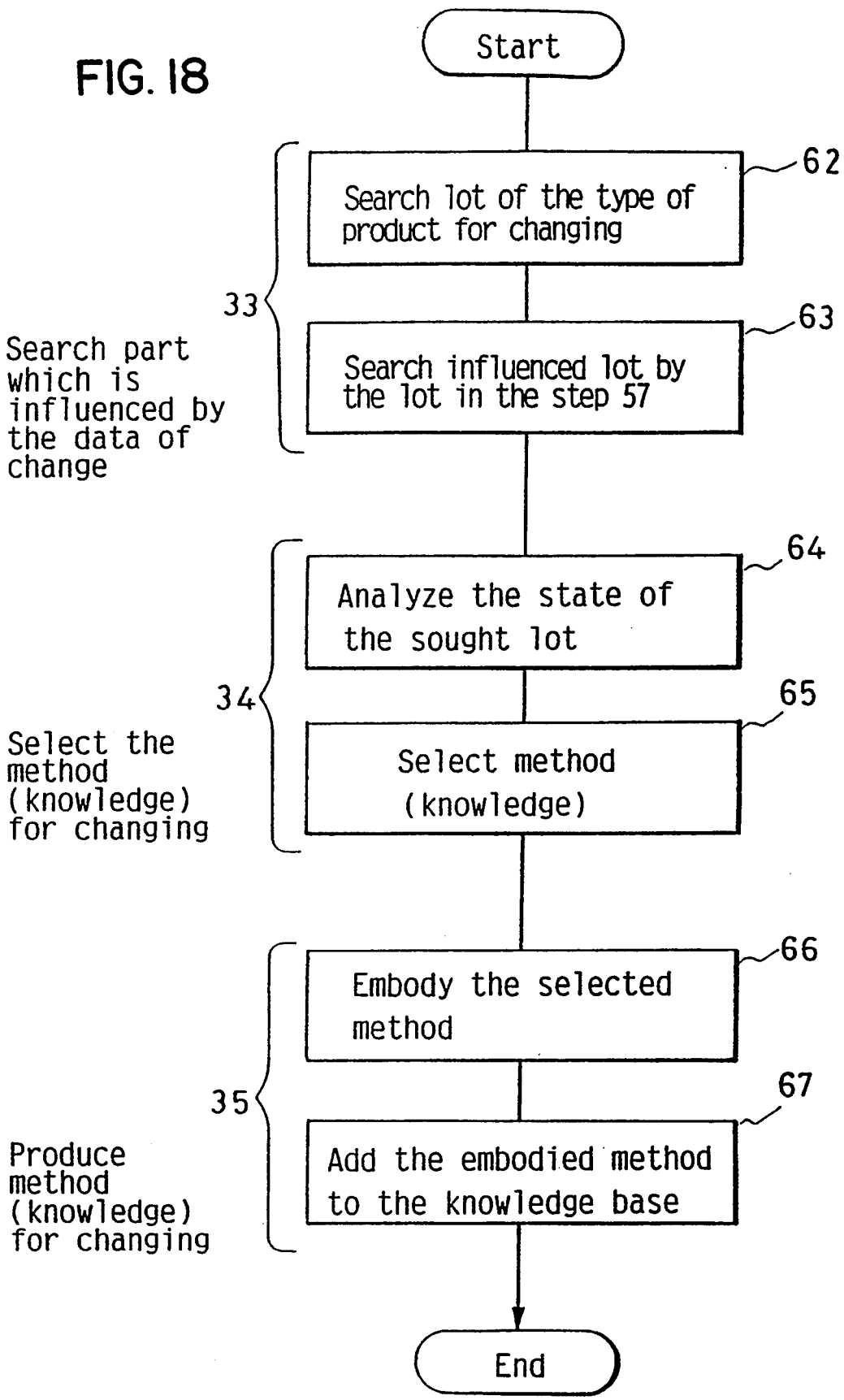

FIG. 22

| | Result of the planning of production |
|---|---|
| Information of type of product | Name of type of product, No. of lot, Quantity in lot, Quantity of result of production |
| Information of standard time | The earliest time ready to start, The earliest completable time, The latest time ready to start, The latest completable time, Processing time, Arrangement time, Unit time |
| Information of manufacturing process | Quantity of manufacturing process, No. of manufacturing process, Quantity of division, No. of division |
| Information of time | Time for start operation, Time for completion of operation, Time for start arrangement |
| Information of facility | Name of group of facility, Name of facility, Index name of facility |
| Information of supplement | Margin time |
| Flag | Flag indicates process of planning (plan) |

FIG. 27

| Name of type of product: 530N | | Manufacturing process: A | | Quantity: | | Date for start: | | Appointed date of delivery: | | |
|---|---|---|---|---|---|---|---|---|---|---|
| Name of type of product | | | 1/20 | 1/21 | 1/22 | 1/23 | 1/24 | 1/25 | 1/26 | |
| 1 | A | AH No.1 | | | | | | | | |
| 2 | R | AH No.2 | | | | | | | | |
| 3 | U | AE No.1 | | | | | | | | |
| 4 | M | | | | | | | | | |
| 5 | | | | | | | | | | |
| 6 | | | | | | | | | | |
| 7 | | | | | | | | | | |
| 8 | | | | | | | | | | |
| 9 | | | | | | | | | | |
| 10 | | | | | | | | | | |

Name of type of product 535N

| Manufacturing process | 1/20 | 1/21 | | | | |
|---|---|---|---|---|---|---|
| A | | | | | | |
| R | | | | | | |
| U | | | | | | |
| M | | | | | | |

| Set operation | Chart | Information of product type | Change product type | End |
|---|---|---|---|---|

FIG. 29

*** Schedule of product ( 88, July 3 ) ***

( Start arrangement:■, Producting:■,
Continuing production:■, Start production:■
Completion of production:■ A division: 30 minutes )

| Index name of facility | No. of lot | No. of manufacturing process | No. of division | Quantity in lot | Quantity of production | 2 4 6 8 10 12 14 16 18 20 22 24 |
|---|---|---|---|---|---|---|
| AH No. 2 | 3 | 1 | 1 | 880 | 200 | s    E |
| AE No. 1 | 3 | 2 | 1 | 880 | 880 | rS    E |
|  | 6 | 2 | 1 | 385 | 385 |       rS  E |
|  | 5 | 2 | 1 | 825 | 0 |          S    E |
| RT No. 1 | 3 | 3 | 1 | 880 | 880 |              rS       E |
|  | 6 | 3 | 1 | 385 | 385 |                       rS  E |
|  | 5 | 3 | 1 | 825 | 0 |  |
| RH No. 1 | 3 | 4 | 1 | 880 | 823 | S                     e |

Input by key ( In case "E" is inputted, return the ex-menue ) and please press "改行" key.

FIG. 30

*** Data of rate of facility operation ( 88,July ) ***

Index name of facility: RTu No.1    ( ★ : Operation, ⊞ : Arrangement, Unit : % )

| Date of production | Rate of operation | Rate of constraint | 20 40 60 80 100 120 140 160 180 200 |
|---|---|---|---|
| 1 | 37 | 45 | ****+++++++ |
| 2 | 72 | 81 | **+*+*+***+++ |
| 3 | 71 | 80 | **+*+*+***+++ |
| 4 | 82 | 93 | **+*+*+***++++ |
| 5 | 60 | 69 | **+*+***+++ |
| 6 | 81 | 93 | **+*+*+***++++ |
| 7 | 69 | 78 | **+*+*+***+++ |
| 8 | 90 | 100 | **+*+*+*+***+++ |
| 9 | 82 | 98 | **+*+*+***++++ |
| Average value | 72 | 82 | **+*+*+***++++ |
| (Day(s) for operation) | 72 | 82 | **+*+*+***++++ |
|  |  |  | **+*+*+l*+*+*+***1 |

Input by key ( In case "F" is inputted, return the ex-menue ) and please press "改行" key.

FIG. 31

*** Data of rate of facility operation ( 88,July ) ***

Index name of facility: UK No.1    Quantity of stock (Max.: Rate to 1538 expressed as a percentage %)

| Date of production | Data of quantity of stock | 10 | 20 | 30 | 40 | 50 | 60 | 70 | 80 | 90 | 100 |
|---|---|---|---|---|---|---|---|---|---|---|---|
| 1 | 159 | ***** | | | | | | | | | |
| 2 | 224 | ******* | | | | | | | | | |
| 3 | 915 | ********************************* | | | | | | | | | |
| 4 | 1538 | ************************************************************ | | | | | | | | | |
| 5 | 515 | ****************** | | | | | | | | | |
| 6 | 603 | ********************** | | | | | | | | | |
| 7 | 572 | ******************** | | | | | | | | | |
| 8 | 432 | **************** | | | | | | | | | |
| 9 | 326 | *********** | | | | | | | | | |
| Average quantity of stock: 587 | | | | | | | | | | | |

Input by key (In case "E" is inputted, return the ex-menue) and please press "改行" key.

INFERENCE PLANNING SYSTEM

This is a division of application Ser. No. 08/116,730, filed Sep. 7, 1993, now U.S. Pat. No. 5,321,620; which is a continuation of Ser. No. 07/356,302 filed May 24, 1989, abandoned.

BACKGROUND OF THE INVENTION

1. Field of the Invention

The present invention relates to an inference planning system which is for making production plans, facility layouts and so on in manufacturing.

2. Description of the Related Art

Recently, with technological innovations or changes of consumer preference, rapid design changes in manufacturing have become common. That is, recently, many types of goods need to be manufactured, with relatively small quantities for each of the many types, within a short time period before an appointed date of delivery thereof. The above-mentioned manufacturing with many changes after relatively short periods of time becomes very important to keep up with quickly changing market trends. Therefore, it is desired that rapid and accurate production plans and facility layouts are made. Furthermore, quick responses to frequent changes of the plans and consecutive modifications for filling in gaps between planning and results of production are needed.

For instance, Japanese unexamined published patent application (Tokkai sho 62-52666) discloses a prior art of a planning system. An outline of the prior art will be described with reference to FIG. 33, which shows a schematic block diagram of the conventional planning system for production. Numeral 101 designates a storage device for storing basic data, e.g. types of manufacturing devices, their facilities, quantities, capacity and layout thereof. Numeral 102 designates an input device for inputting data of types of products to be produced and quantity (numbers) thereof, namely data of products. Numeral 108 designates a central processing unit (CPU) having a program 103 for production planning which makes a production plan. The program 103 uses a storage device 104 as a memory for storing many variables used in making the plan based on the above-mentioned basic data and data of products. Numeral 105 designates a display for indicating a production plan which has been made by this system. Numeral 106 is a printer for printing out the production plan. Numeral 107 designates a storage device for storing the production plan.

The CPU (central processing unit) controls the above-mentioned devices, equipments and program. In the abovementioned system, the method for making the production plan comprises the steps of: (1) inputting the above-mentioned data of products by the input device 102; (2) making or developing a production plan automatically by utilizing the program 103 for production planning and then storing the developed production plan in the storage device 104, whereby the production plan development is accomplished by combining the basic data stored in the storage device 101 with the data for products in the (CPU); (3) storing the production plan in the storage device 107; (4) displaying the production plan with the display 105; and (5) printing the production plan with the printer 106.

However, in the case that the production plan is not satisfactory or some modification of the plan is necessary due to newly requested changes in product or system specifications, the structure of the above-mentioned device needs to produce an entirely new plan for production planning from the beginning. Such modification requires additional time for processing, and results in a problem of low efficiency in planning. Therefore, because of the above-mentioned low efficiency in modification, a first problem is that the conventional method cannot update frequent modifications in planning by filling up a gap between the plan and the real data which is being sampled at every moment.

Japanese unexamined published patent application (Tokkai sho 63-291166) discloses another conventional planning system. This conventional planning system develops the production plan more easily because a planner uses an interactive method for making the operation plan of the facilities of interest. In this system, operation conditions of facilities are input by a keyboard, and the data representing these conditions are displayed on a CRT display as a table of a plan. The planner can produce the operation plan interactively by scrolling the table of the plan on the CRT display and by using a pointing device for pointing out a position on the CRT display to insert or shift select a menu list of predetermined operations.

In the above-mentioned system, although it is easy to correct the plan, all correction for change of data needs to be input interactively, and the planner must check and correct each point of planning so that the corrections will make the appropriate connections to other points of the plan. The prior art hence has the problem of inefficiency in correction and low reliability of planning.

Furthermore, there are limitations of changeable data and changeable methods in the prior art. The above-mentioned related art has no capability to change, for example, some kinds of data, methods of planning, formatting of output and so on.

Still further, the prior art has the problem of limitations in the usable area for planning.

SUMMARY OF THE INVENTION

An object of the present invention is to provide an inference planning system which enables quick planning and modification of a plan. It is further desirable that such modifications can be made even when a change is necessary in an existing manufacturing scheme having urgent production requirements. For example, it may be necessary to add a change and stop facility operation because of unforeseen trouble of the facility and/or because of modification for updating between the plan and the present collected data of production.

The present invention can provide an inference planning system which enables accurate planning and modification of a plan without inconsistencies even when interactive changes are made to the plan.

Furthermore, the present invention can provide an inference planning system which has flexibility to handle a change of data, a change of planning method, and/or a change of output format of the plan.

These are accomplished by providing an inference planning system which comprises:
- a data base for storing data used for planning functions and data used for changing functions;
- a knowledge base for storing procedures expressed in rule type format which are to be used either in planning functions or changing functions;

an input device through which data in the data base and the knowledge base are input;

a working memory for temporarily retaining a result of inference in the middle of planning or changing;

a display or a printer for outputting the plan, the data and the used procedures;

an inference engine having means for planning and means for changing a plan; and a central processing unit for controlling the data base, the knowledge base, the input device, the working memory, the inference engine and at the display or the printer.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 8(b) shows a block diagram of hardware realizing the basic diagram shown in FIG. 8(a).

FIG. 9 shows an example of production processes for a product.

FIG. 10(b) shows a process diagram in the inference engine of the second embodiment, FIG. 11 shows some an exemplary display displaying basic data according to the present invention.

FIG. 12 shows production data according to the present invention.

FIG. 13 shows an exemplary time schedule of dally facility operation.

FIG. 14 shows exemplary time schedule data for setting a period for disabling operation of a facility.

FIG. 15 shows exemplary data of daily production results.

FIGS. 16(a) and 16(b) show the flow chart of the planning procedure according to the present invention

FIG. 18 shows the flow chart of the procedure according to the present invention for reconstructing the knowledge base.

FIG. 22 shows information about the result of the planning of production.

FIG. 27 shows an example of a display when the planner temporarily references to another production planning in FIG. 26.

FIG. 29 shows an exemplary production plan in "Gantt chart" format as an example of graphic output.

FIG. 30 shows a table indicating data of rate of facility operation.

FIG. 31 shows a table indicating data of quantity of stock as an example of graphic output.

DESCRIPTION OF THE PREFERRED EMBODIMENT

Hereafter, preferred embodiments of the present invention are described with reference to the accompanying drawings.

Figure 1:
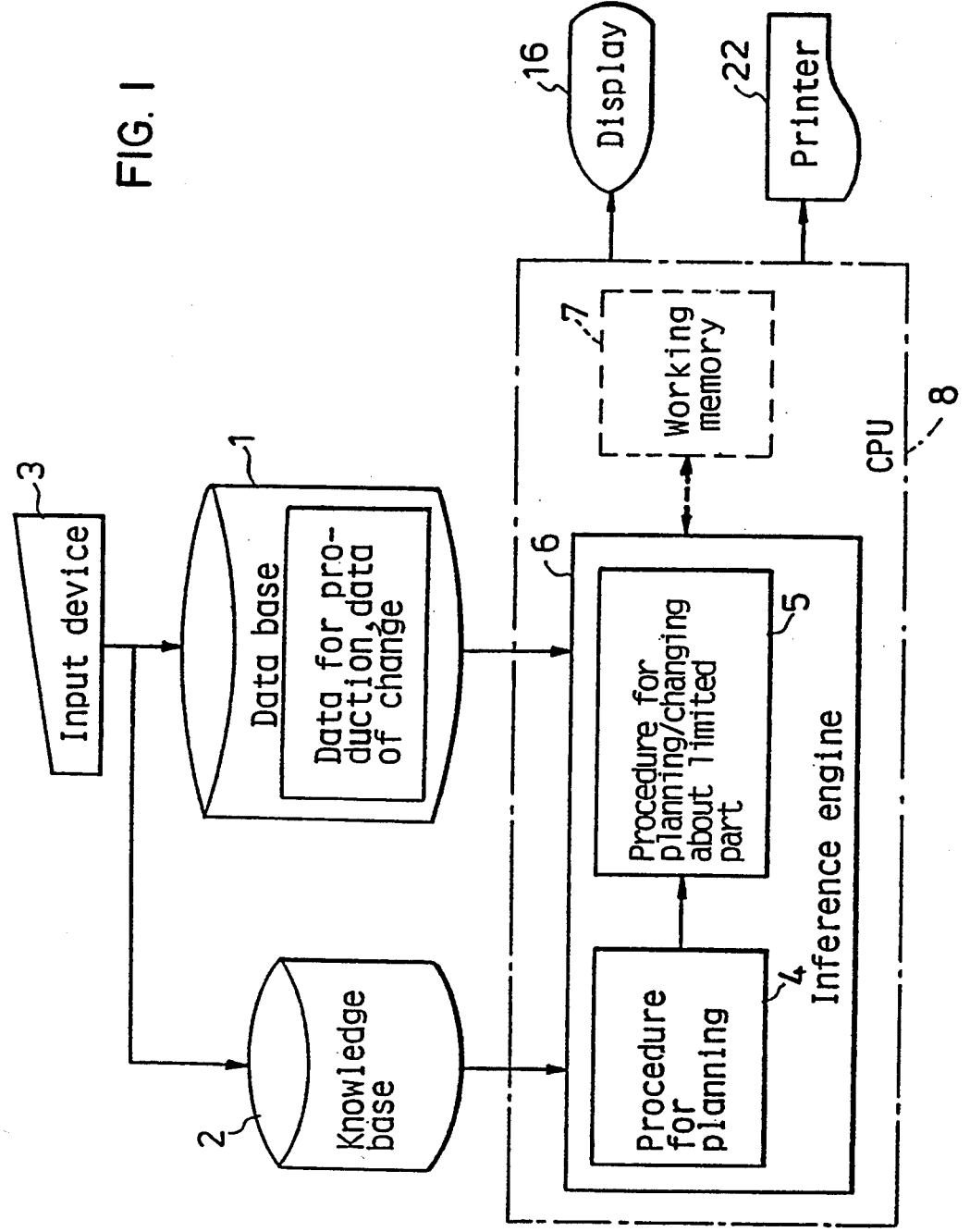
FIG. 1 shows a block diagram of a first embodiment of the present invention.

FIG. 1 shows a block diagram of an inference planning system which is a first embodiment of the invention. The production planning is made mainly through an inference engine 6 as described in accordance with FIG. 1. In FIG. 1, a data base 1 stores both planning data and succeeding data of change. A knowledge base 2 stores data necessary for procedures corresponding to respective essential points on planning scheme. These procedures, expressed in rule type format, are used for the planning and for the later changing of the relevant production plan. In the present invention, operations in every process are performed in compliance with predetermined rules. The rules are stored in the knowledge base 2 and are read out in accordance with requirements of the process. A Meta Rule method is applied to select a rule which is used for a process.

The meaning of "inference" in the present invention is to perform selecting the rule, which is performed in the inference engine 6. Numeral 3 designates an input device, through which data in the data base 1 and the knowledge base 2 are input. Numeral 4 designates a procedure for planning, and numeral 5 designates a local procedure for planning. The planning procedure 4 and the local procedure planning 5 are both disposed in the inference engine 6 which is disposed in a central processing unit (CPU) 8. Numeral 16 designates a display, and numeral 22 designates a printer. The result of planning and other data are output to the display 16 and/or the printer 22. The working memory 7 temporarily retains results of planning in the middle of planning or modifying. The CPU 8 controls processing between the data base 1, the knowledge base 2, the input device 3, the inference engine 6 and the working memory 7.

FIG. 9 shows an example of a production process for a product, such as a printed circuit board.

For instance, let us take a production process for a printed board of type No. 530N. This production process assumes that there are eleven facilities in a factory, and one facility in an external factory such as an outside factory. The printed board is made through manufacturing processes A, R, U and M in that order. Facilities AH No.1, AH No.2 and AE No.1 are for the manufacturing process A (e.g., the process to insert Axial parts). Similarly, facilities RT No.1, RT No.2, RH No.1 and RH No.2 are for the manufacturing process R (e.g., the process to insert Radial parts). The relation between manufacturing processes U (the process to insert parts of Unusual parts) and M (the process to Mount electronic chips) with other facilities are made in a similar manner. The facilities RT No.1, RH No.1 and RH No.2 which are encircled with a broken line serve as components of a R-manufacturing process 103. However the facilities RT No.2 is not included in the same block 103, because the facility RT No.2 is a part of a continuous process line (manufacturing line) 101 which comprises an inseparable sequence of manufacturing processes A, R and U. In these facilities, the printed board is produced through three proposed process flows. Examples of the three alternative process flows are:

(i) block 102—block 103—block 105—block 104;
(ii) block 101—block 104; or
(iii) block 102—block 10J—block 108—block 104.

Figure 10A:
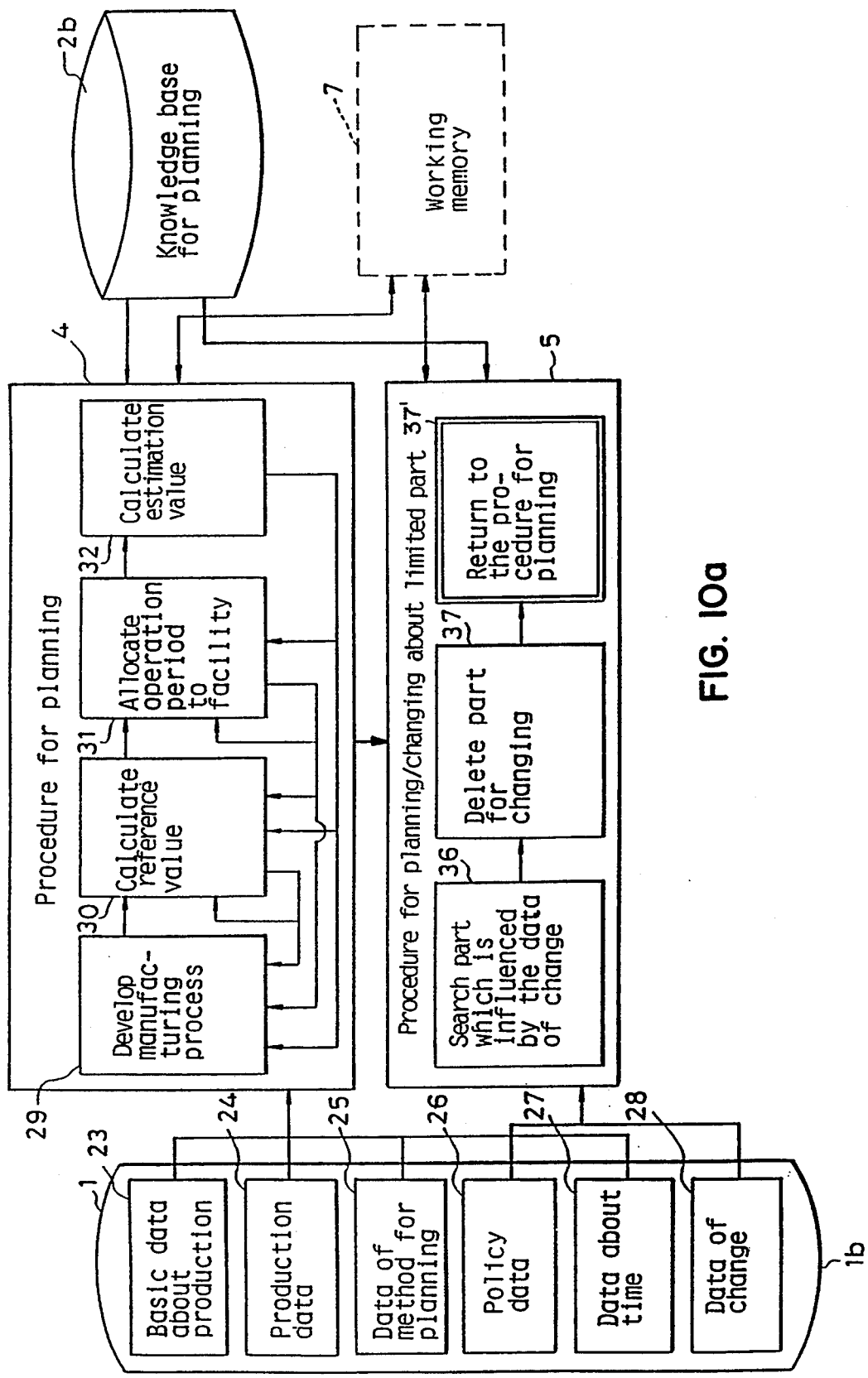
FIG. 10(a) shows a process diagram of the inference engine of the first embodiment.

FIG. 10 (a) shows a flow of data and process in the inference engine 8 which makes the production plan. In FIG. 10, numerals 23 through 28 designate examples of concrete data in the data base 1. Among them, numeral 23 designates basic data for production, such as type of facilities (production means), quantities of facilities, capacities of respective facilities and layout thereof, and so on. FIG. 11 shows a displayed table showing concrete examples of the basic data 23, which include inherent facility capacities. for example, rate of quantity of inserting electronic parts per hour of a printed board producing facility, loading periods showing a period of loading the printed board on the facility and an unloading period showing period of unloading the printed board from the facility. Numeral 24 designates production data for a product to be produced, for example, types, amount or quantities and necessary flow of manufacturing processes (namely, for the printed board type No. 530N, necessary flow is "A→R̄→U→M") of products. FIG. 12 shows a concrete example of the production data 24, which is a basic specification of a schedule as to a lot which is a basic unit for production. The following data is input into the specification of the schedule: type of product (e.g., type of printed board No. 530N in this example), respective numbers of lots, point of time for starting production (e.g., time for starting the process A in FIG. 9 in this example), and point of time for finishing, that is, an appointed time limit determined from time of delivery of the product (namely required time for completion of the process D in FIG. 9 in this example). Furthermore, as shown in FIG. 12, many lots for the same or different types of products are input. As a matter of course, a plan of a production satisfying all the respective data of the lots is made. Numeral 25 in FIG. 10(a) designates data of methods for planning the production plan such as "backward planning", and "forward planning" and also condition data as to methods for planning such as "standard of dispatching". These conventional planning methods or standard "backward planning" "forward planning" "standard of dispatching" and other technical terms in the specification, are elucidated in the publication Engineering of Production Management, written by KATSUNDO Hitomi, published by KORONASHA 1978, first edition. Numeral 26 designates policy data of planning as to policy of factory management, such as increase of the rate of facility operation, decrease of the total stock and shortening of the below-mentioned lead time. Numeral 27 designates data about time of daily facility operation. FIG. 13 shows a time schedule of daily facility operation as a concrete example of the data about time namely which is a period of operation in a day. Numeral 28 designates data of succeeding changes. This data of succeeding changes is input to change the establish production plan; in other words, the data is input after the production plan has already been prepared with items such as an appointed time limit of production and an indication of overtime work for an extra urgent production, stop of facility operation and/or, results of present production. FIG. 14 shows time schedule data for indicating and setting a period for disabling operation of facility, and FIG. 15 shows data of daily production results with respect to daily product conditions as concrete examples of the data of change 28.

Each procedure which is to be used at respective predetermined points on planning in the below mentioned steps 29, 30, 31, 32, 33, 34, 35, 38 and 37 are stored in the knowledge base 2. FIG. 20 shows examples of procedures expressed in rule type format as "if . . . (part of condition) then—(part of result)" in the knowledge base 2.

Figure 20A:
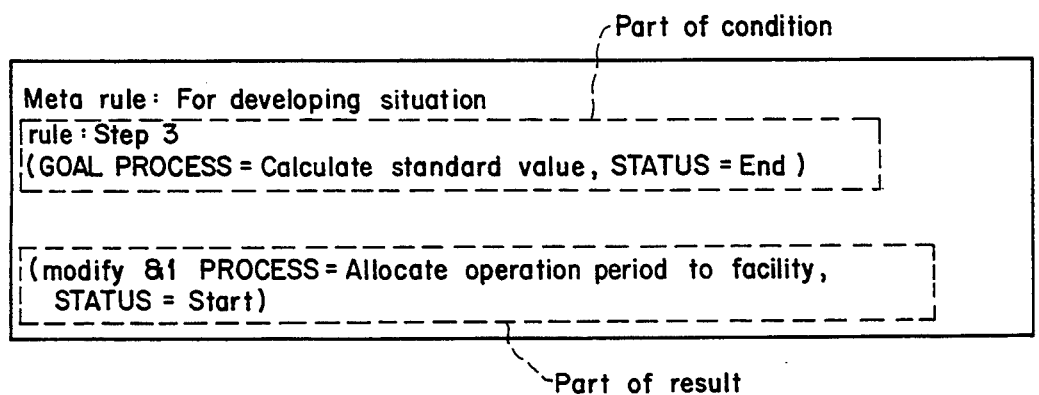
FIGS. 20(A) though 20(D) show examples of procedures according to the present invention expressed in rule type format.
Figure 20B:
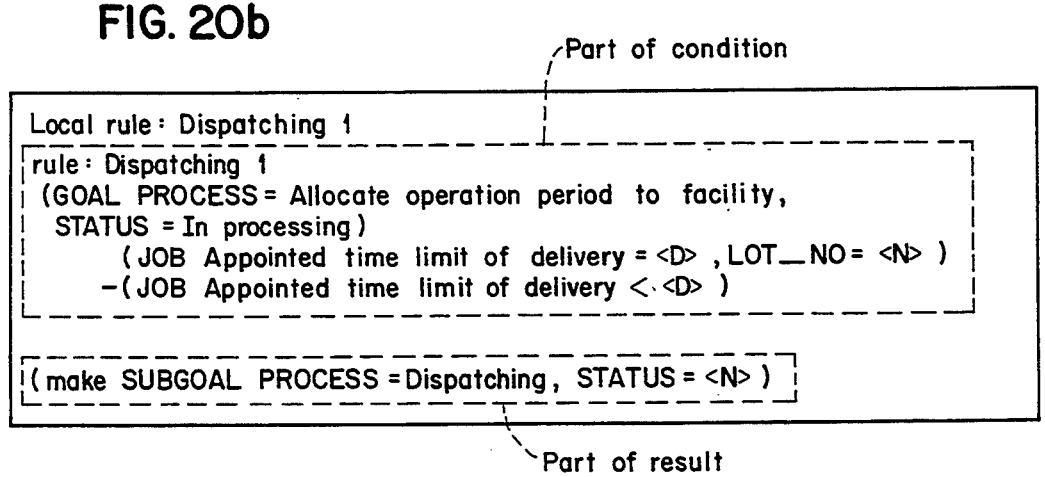

In FIG. 10 (a), the planning procedure 4 and the changing procedure 5 each have a main flow of procedure as mentioned below. The planning procedure 4 develops a daily production plan utilizing the working memory 7 based on the data 23 to data 27. The planning procedure 4 comprises steps 29, 30, 31 and 32. Numeral 29 designates a step for developing a manufacturing process. In the step 29, a flow of processes is determined corresponding to type, since necessary corresponding data of a rule is provided from the knowledge base 2; for example, one of the three processes in FIG. 9 may be selected and thus the corresponding data of a rule would be retrieved from the knowledge base 2. Examples of the rule are shown in FIGS. 20(A) and 20(B). FIG. 20(A) represents the Meta rule which advances the process from a step 30 to a step 31. A rule name is "step 3" which represents advance of the process from the step 30 to the step 31, for example. "GOAL" means a position in the working memory 7. A step of the process and a status of the step are stored in a position of the working memory 7 called the "GOAL." In the present case, the step is "calculate reference value," and the status is "End" of the step.

"Modify & 1" means changing both the data in the "GOAL." The step in the process is changed from "calculate reference value" to "Allocate operation period to facility," and the status is changed to "Start" of the step.

Figure 20C:
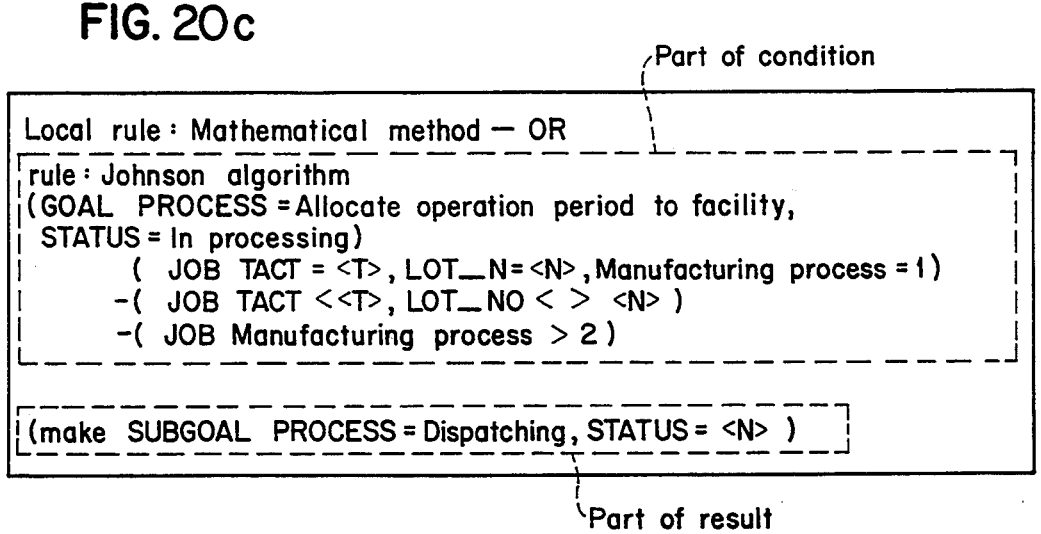
Figure 20D:
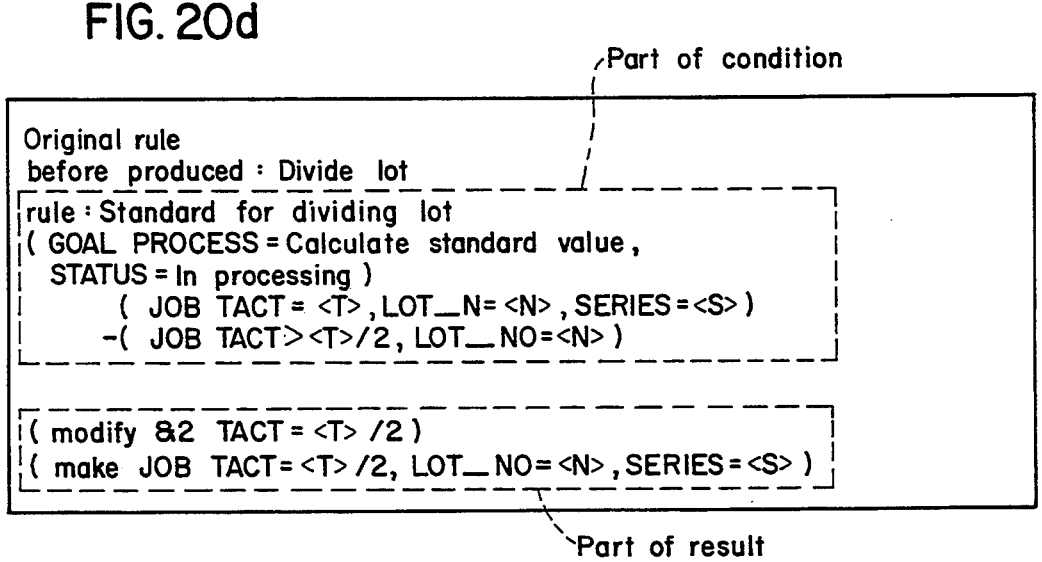

In a similar manner, in FIG. 20(B), "Local rule" means a process in the rule which is selected by the above-mentioned Meta rule. "Dispatching" means selecting one lot from a plurality of lots. FIGS. 20(c) and 20(D) show examples of representations of other rules for selecting a process. In every representation, "Part of condition" represents a condition, and "Part of result" represents the process which is selected on the basis of the condition. In the description of the specification, the term "knowledge" is used in the same meaning as the "rule". Numeral 30 designates the step of calculating a reference value which becomes the basis for planning, such as the earliest time to start a production run, the latest time a production run may be completed, margin time (slack time) of the facility and efficiency of balance. Numeral 31 designates the step of allotting each concrete operation period to the facility. Numeral 32 designates the step of calculating an estimation value. In the estimation calculation step 32, estimation for quality of the drafted plan is made by calculating the rate of facility operation, the total stock, the lead time from allotted operation, and so on.

FIGS. 16(a) and 16(b) shows the flow chart of the above-mentioned steps 29, 30, 31 and 32 as shown in FIG. 10(a).

The step 29 for the manufacturing process comprises:
a step 38 for deciding a manufacturing process for all types of products (e.g., the example in FIG. 9 shows a flow of process No.1, No.2 or No.3, one of which is selected for the type of printed board No. 530N); and
a step 39 for provisional selection of facilities used in every manufacturing processes for all types of products (e.g., in case of the process No.1 in FIG. 9, AH No.2 or AE No.1 can be selected).

The step 30 for calculating a reference value comprises the following steps.

A step 40 calculates a line balance of respective types of products.

A step 41 compares respective products with corresponding predetermined values;

A step 42 divides a long operation lot which causes a large loss of the line balance when the line balance is smaller than a predetermined value. The step 42 then returns to the step 39 (in order to select one more facility provisionally).

A step 43 calculates the earliest calculated start time whereby a start of the manufacturing process can be made for respective lots. The step 43 also calculates the earliest completion time whereby completion of the process can be made for the respective lots, A step 44 calculates the latest calculated start time whereby the start of the manufacturing process can be made for respective lots. The step 44 also calculates the latest completion time whereby the completion of the process can be made for the respective lots.

A step 45 checks whether the times of the above-mentioned calculations in the respective lots will be in accordance with the appointed time limit of delivery. In other words, step 45 determines whether the calculated earliest start time is earlier than the time to start the production (e.g., as shown for example in FIG. 12) or whether the calculated latest completion time is later than the time to complete the production in FIG. 12; if either of the two conditions are found to be true, the step 45 outputs the check result that the calculated time is not-in-time of the appointed time.

A step 46 changes the production data 24 (e.g. the time to start the production or the time to complete, as shown in the table of FIG. 12), and then returns to the step 38 when the check result is not-in-time of the appointed time. In the alternative, step 46 returns to step 43 when any change of the production data 24 results in not-in-time, so that another process flow can be selected. For example, in FIG. 9, an alternative process would be selected from flow No.1, No.2 and No.3.

Step 47 calculates margin time periods for respective facilities, such as the time difference between the calculated earliest start time and the calculated latest start time.

The step 31 for allotting each operation period to a facility is disclosed in FIG. 16(b). As shown in FIG. 16(b), step 31 includes the following steps.

Step 48 selects the type of product which is to be allotted preferentially to respective facilities when, even with the calculating change of the production data, the calculated time is not in time of the appointed time. The product selection and allotment is performed in a given order by a predetermined "standard of dispatching" procedure stored in the knowledge base 2.

Step 49 selects a lot from the types of products by the "standard of dispatching" procedure and allots the operation period for the selected lot to each facility.

Step 50 checks whether the allocation of step 49 is possible. In other words, the check result indicates that the allocation is not allottable either when the start time of allotted operation period is earlier than the earliest time ready to start or when the end time of allotted operation period is later than the latest completable time.

Step 51 changes the production data, e.g. the time for start or the time for completion as shown in FIG. 12, when the check result is not allottable. Step 51 thereafter returns to the step 38, 39, 43 or 49. For example, in the example of FIG. 9, in case RH No.1 is first selected provisionally in the step 39, the same type of facility RH No.2 is selected in the step 51 instead of RH No.1 and thereafter returns to the step 49; the second time the step 51 is performed, the process returns to the step 43; the third time the step 51 is performed, the process returns to the step 39 wherein another type facility RT No.2 is selected instead of the type RH. The next time the step 51 is performed, the process returns to the step 38.

The step 32 for calculating estimation values comprises the following steps.

Step 52 calculates a virtual load time of each facility under an assumption that the facility is able to work without any limit of a time period in a day. The step 52 also calculates rates of facility operations, which are rates of operations of the facility when the operation periods for respective lots are actually allotted to facilities.

Step 53 calculates a lead time, defined as a period from the start of the operation of the first manufacturing process for each product to the completion of the last manufacturing process for the same product.

Step 54 calculates the intermediary stock produced in among each manufacturing process, and the total stock of final products which is to be stored during the time period from the completion of the last manufacturing process of a product to the appointed time limit of delivery.

Step 55 compares these estimation values from step 54 with respective predetermined values to determine the following: (i) whether the rate of facility operation is larger than a predetermined rate; (ii) whether the lead time is shorter than a predetermined time; and (iii) whether amount of stocks are less than a predetermined amount.

When the estimation values are found in step 55 to be undesirable, a step 56 is performed to change the production data, e.g., the time for starting production, or the time for completion as shown in FIG. 12. The step 56 returns to the step 38, 39, 43 or 49 in the same manner disclosed for the step 51.

The first daily production plan per minute is developed as mentioned above by the planning procedure 4, which includes the process discloses in FIGS. 12(a) and 12(b).

The procedure 5 comprises step 36, 37 and 37'. The step 36 searches for all limited parts which are influenced by the data of change. The inference engine 8 searches all lots which are to be changed. In the procedure for changing a limited part 5, when a succeeding change in the plan becomes necessary after development by the planning procedure 4, an immediate modification of the plan is made. As shown in FIGS. 10(a) and 10(b), the planning/changing procedure 5 for a limited part corresponding to the succeeding change is made by first searching in step 36 the parts influenced by the change made by the procedure 4; the data of these changes are represented in the data of change 28. The procedure 37 deletes the parts which were found to have changed. Necessary knowledge for the procedure 5 is stored in the knowledge base 2. Thus, the step 37 is for clearing the searched limited part. In this step 37, the inference engine partly clears the reference values in the step 30, the list of allocation to facilities in the step 31 and the values for estimation in the step 32 in the limited part of the original plan. The step 37' returns the process to the procedure 4 for modification of the original plan. The above-mentioned steps of the procedure 5 are repeated for each and every change in the planning.

Figure 17:
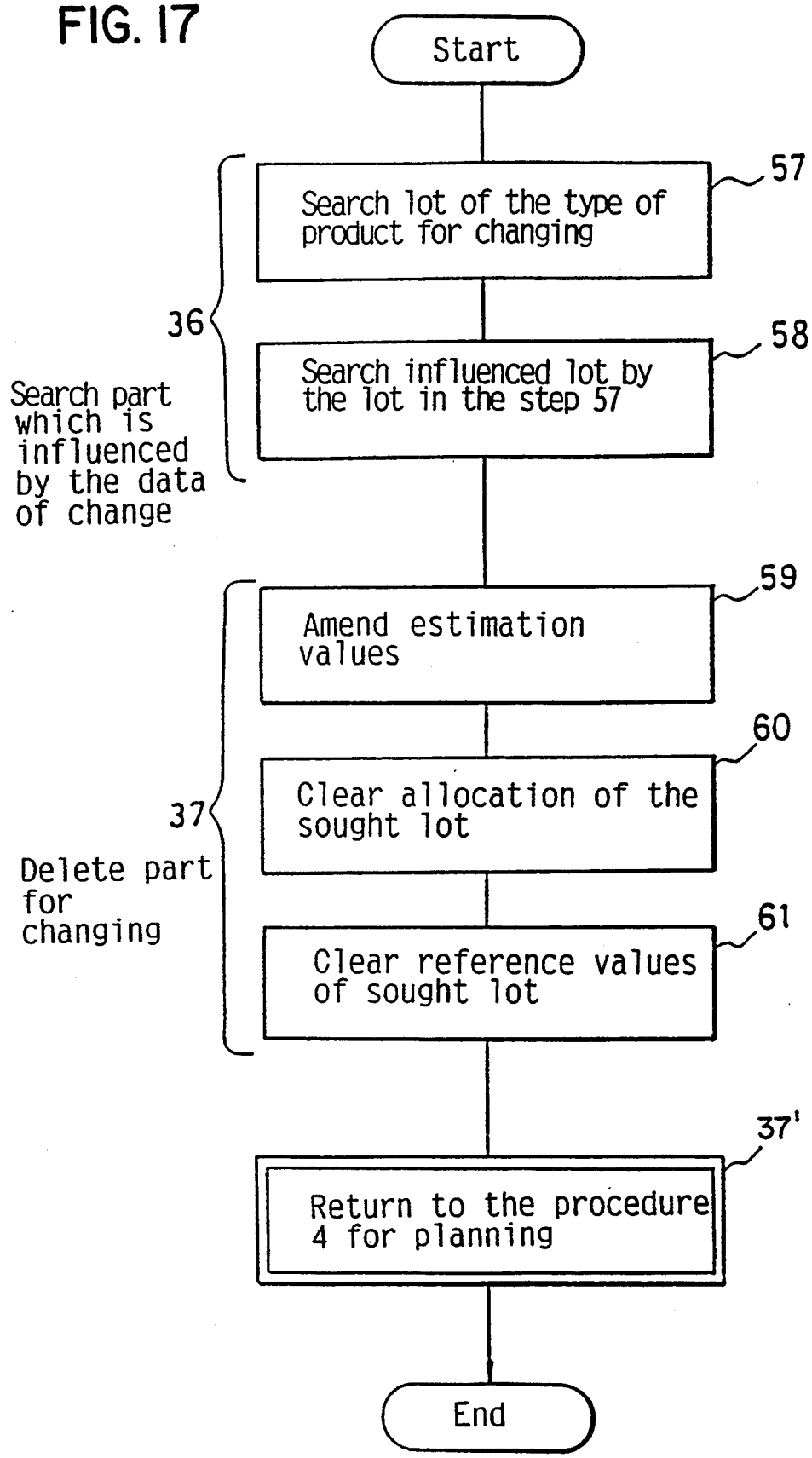
FIG. 17 shows the flow chart of the procedure according to the present invention for planning/changing about a limited part.

FIG. 17 shows the flow chart of the above-mentioned steps 36, 37 and 37'.

The step 36 for searching the limited part for changing comprises the following steps.

Step 57 searches for any allotted product lots of the type pertinent to change which are to be changed in all the manufacturing processes from the working memory 7.

Step 58 searches for any allotted lot which is influenced by the searched lot in the step 7 and is necessary to be changed from the working memory 7.

The step 37 for deleting the limited part for changing comprises the following steps.

Step 59 amends estimation values by calculating virtual load of facility, the rates of facility operations, the lead times, the intermediary stock and the total stock of final products without the above-mentioned data to be changed.

Step 60 clears allocation of the searched lot.

Step 61 clears reference values of the searched lot. In other words the step 61 changes the data of the line balance, the earliest start time of the operation, the calculated earliest completion time of the operation, the calculated latest start time of the operation, the calculated latest completion time of the operation, and the margin time to the unestablished values such as blank values.

After the step 61, the flow is connected in step 37' to the above-mentioned step 4. In the step 4 via step 37', new reference values instead of the above-mentioned cleared ones are re-calculated. New allocation instead of the above-mentioned cleared one is done, and estimation values are re-calculated. Therefore modification of the original plan is completed.

In the above-mentioned step 4 via step 37' and the steps 36 and 37 of the procedure 5 for planning/changing about limited part calculation, the above-mentioned comparison, deletion, search and so on are done efficiently and quickly, since the working memory 7 retains result of original planning in the middle thereof.

Figure 21:
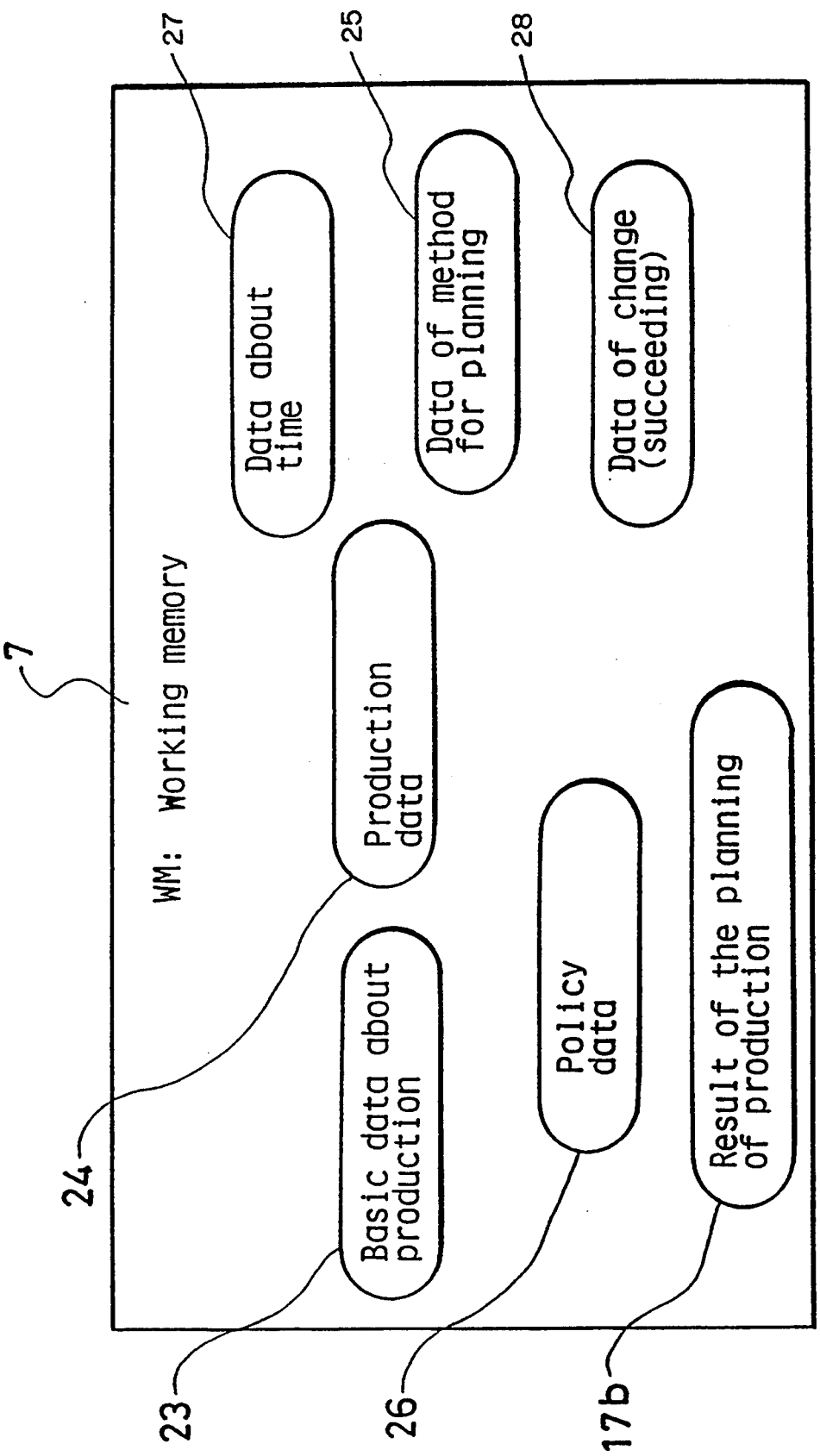
FIG. 21 shows composition of data in the working memory of the preferred embodiments.

FIG. 21 shows the data (result of original planning in the middle thereof) which is retained in the working memory 7. FIG. 22 shows a more detailed composition of information about the result of the planning of production (the inference result 15') in FIG. 21. The result of the planning of production (17b) are data which are structured at every operation in lots and which have information of types of products, of standard time period, manufacturing process of time, of facility and of supplement as shown in FIG. 22.

Figure 2:
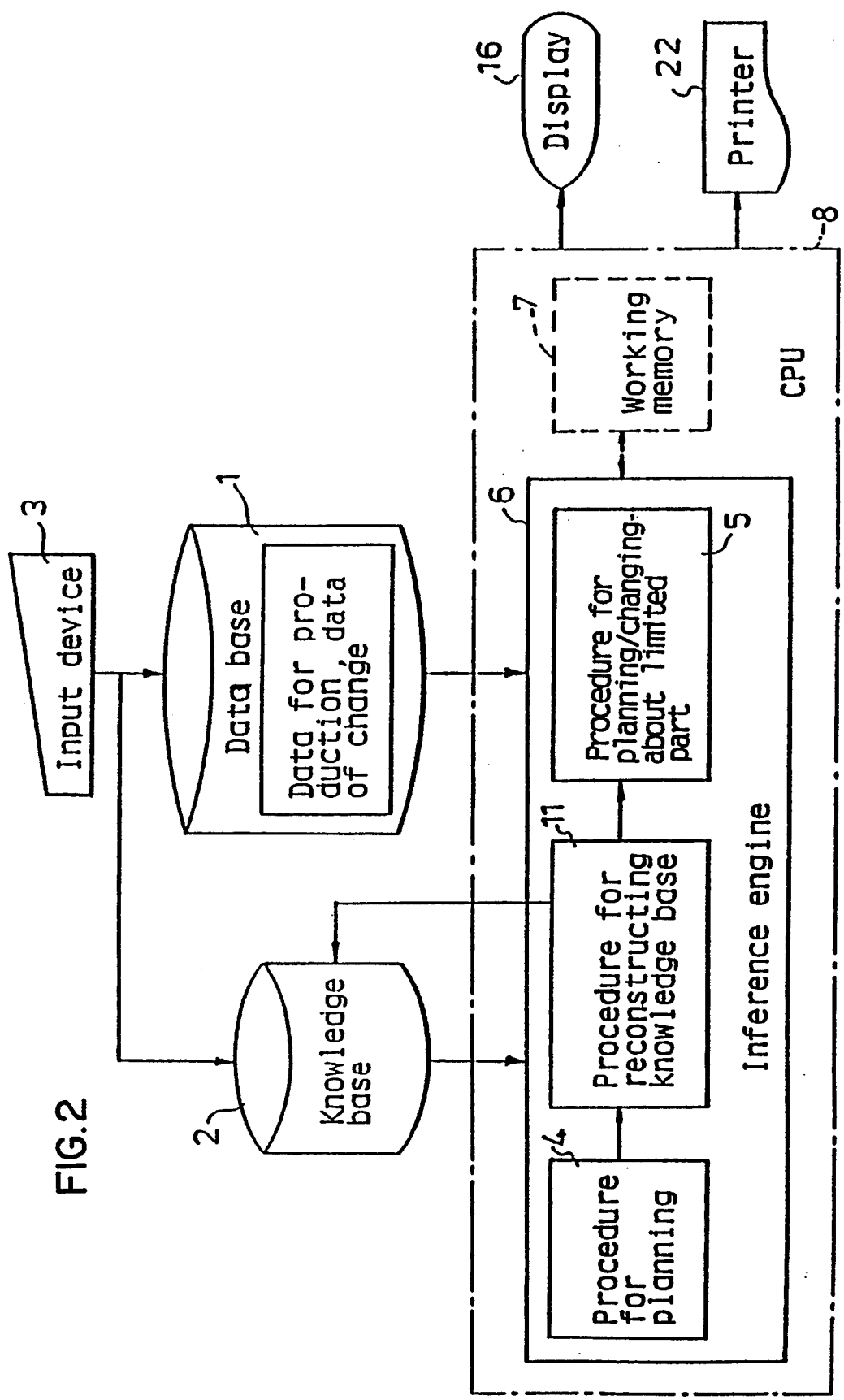
FIG. 2 shows a block diagram of a second embodiment of the present invention.

FIG. 2 and FIG. 10(b) show a block diagram of an inference planning system which is a second embodiment of the invention. The second embodiment includes a step of procedure for reconstructing knowledge base 11. Corresponding parts and components to the first embodiment are shown by the same numerals and marks, and the description thereon made in the first embodiment similarly apply. Differences and features of this second embodiment from the first embodiment are as follows. In the above-mentioned first embodiment as disclosed in FIGS. 16(a) and 16(b), in the steps 42, 46, 51 or 56 of the procedure 4a, in case all returning to the designated steps result in failure, the planning is stopped.

In case of the above-mentioned failure, FIG. 10(b) shows a procedure 11 for reconstructing the knowledge base 2 and proceeding with the planning. Necessary knowledge for the procedure 11 is stored in the knowledge base 2b. Namely, as to inconvenience of production planning, the procedure 11 for reconstructing the knowledge base 2 searches every lot to be changed, searches any lot which is influenced by it, and re-constructs the knowledge base 2 in order to provide planning without inconvenience.

The procedure 11 shown in FIG. 10(b) comprises step 33, 34 and 35. The step 33 searches for all limited parts which are influenced by the data of change; in other words, the inference engine 6 in the step 33 searches any lot which is to be changed. The step 33 of the procedure 11 is the same as the above-mentioned step 36 for the procedure 5. In the step 34 selects the method for changing, such that the inference engine 6 selects knowledge in the knowledge base 2 for planning knowledge which expresses the method for changing the lot which is to be changed. The step 35 produces the method for changing, such that the inference engine 6 reconstructs the above-mentioned selected knowledge in accordance with the lot which is to be changed.

FIG. 18 shows the flow chart of the above-mentioned steps.

As shown in FIG. 18, the step 33 for searching a limited part for changing comprises the following steps.

Step 62 searches for any allotted product lots of the type pertinent to change which are to be changed in all the manufacturing processes from the working memory 7.

Step 63 searches for any allotted lot which is influenced by the searched lot in the step 62 and is necessary to be changed from the working memory 7.

The step 34 for selecting changing method (knowledge) comprises the following steps.

Step 64 analyzes the state of the lot of the type of product, for example, when the inconvenience due to the delaying lot has the time of completion later than the appointed time limit of production. The inference engine 6 measures (e.g., investigates) the margin time of another lot just prior to the delaying lot and analyzes the data. In other words the inference engine 6 decides whether replacement of the delaying lot with another lot provides results which satisfy both the appointed time limits thereto.

Step 65 selects a method (knowledge) from rules input into the knowledge base 2 for resolving the inconvenience due to delay of the appointed time limit.

The step 35 for producing a method (knowledge) for changing comprises the following steps.

Step 66 embodies the selected rule such that it corresponds only to the lot which is to be changed by adding the appointed condition for the lot No. on the part of condition in the rule.

Step 67 adds the embodied rule to the knowledge base 2 for planning.

FIG. 20(D) shows an example of the knowledge in rule format stored in the knowledge base 2. The knowledge shown in FIG. 20(D) is for dividing a long manufacturing process which has undesirably long operation period, in this case being more than twice longer than any other manufacturing process in the same lot. The dividing is for the purpose of providing good line balance. Such knowledge is produced by the procedure 11 for reconstructing the knowledge base shown in FIG. 10(b).

Figure 19A:
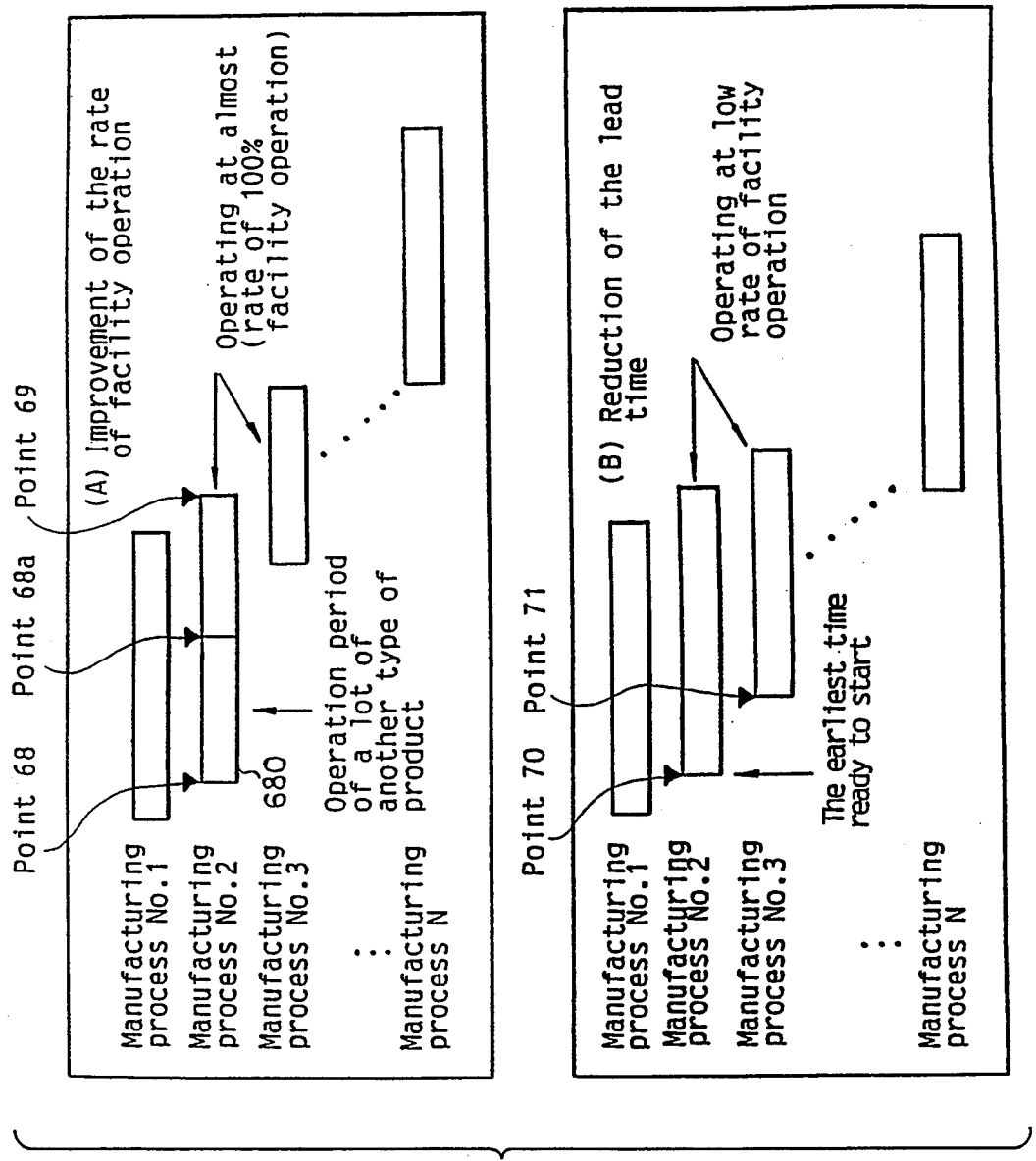
FIG. 19(a) shows exemplary allocation of facility resources.
Figure 19B:
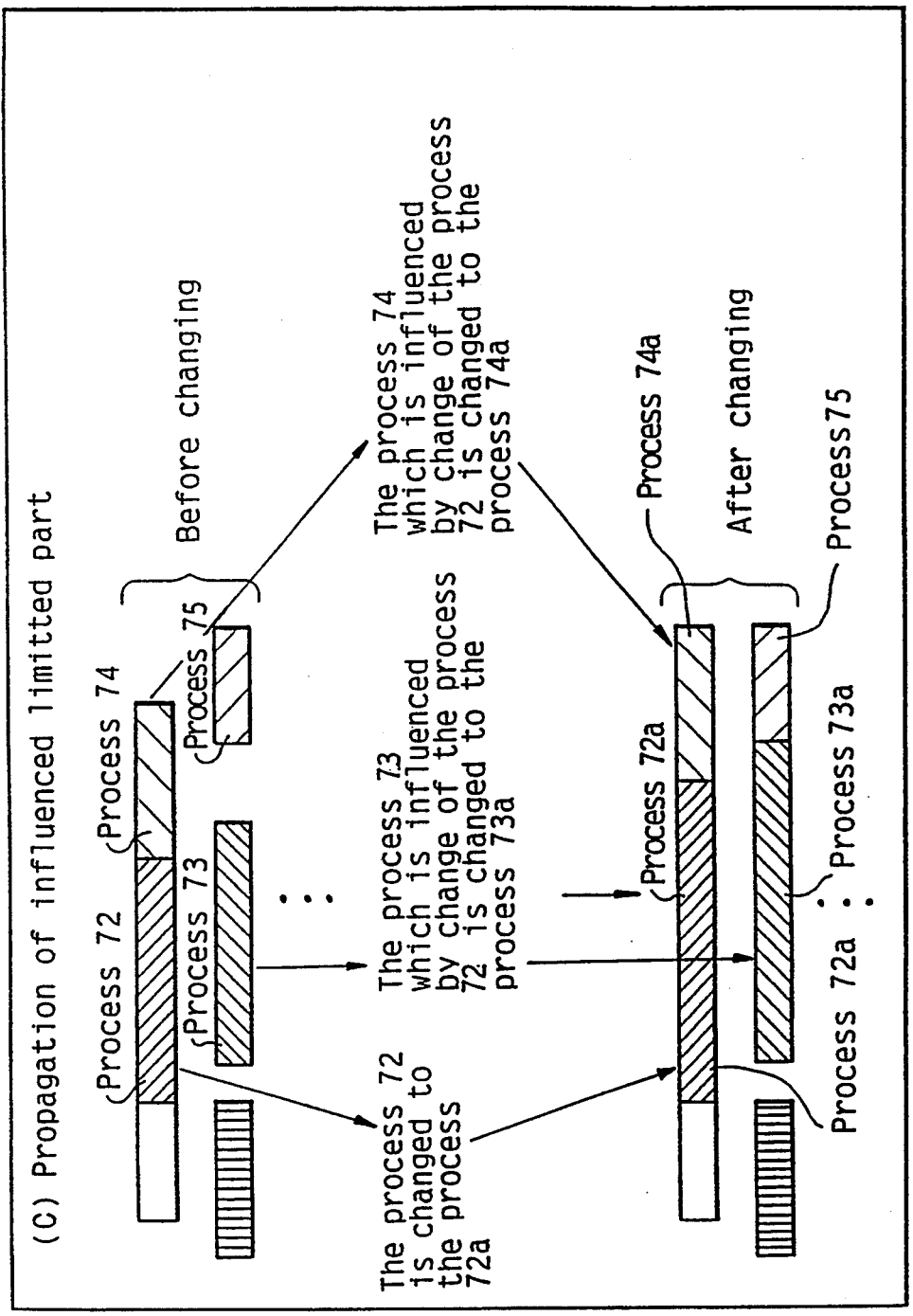
FIG. 19(b) shows results of the procedures of FIG. 19(a).

FIGS. 19(a) and 19(b) show some graphic examples of the result of processes in the inference engine 6 in FIG. 1. This example is concerned with the step 31 for allotting each concrete operation in the procedure 4 for planning in FIG. 10(a). In this example the knowledge "forward" which makes the allocation one by one from the first manufacturing process in order, is input into the data of method for planning 25. One of two policies are input into the planing policy data 26, namely (A) improvement of the rate of facility operation, or (B) shortening of the production lead time. That is, the case (A) is directed to a policy of high facility operation rate, while the case (B) is directed to a short lead time (to obtain a product as early as possible).

Case (A) in FIG. 19(a) shows the allocation of facility which intends to operate the facility at full operation rate. In this case of full rate operation, though the manufacturing process No.2 is able to start at the point 68, the allocation is made to start at the point 68a. Therefore, utilization of an operation period 680 for another type of product is possible. The case (B) in FIG. 19(b) shows the allocation of facility for intending to operate the facility from the earliest start time. Therefore the earliest completion time of the facility is achievable. In such case the facility operation rate of the manufacturing processes No. 2 or 3 will be low.

FIG. 19(b) shows some graphic examples of result of the aforementioned procedure 5 for planning/changing about a limited part. It shows propagation or expansion of the limited part which is influenced by the data of change 28. Namely, the period of the process 72 for a lot is increased as a result an increase of quantity of product in the lot. This enlargement of process 72a changes the process 74 to the process 74a and changes the process 73 to the process 73a, respectively.

Figure 3:
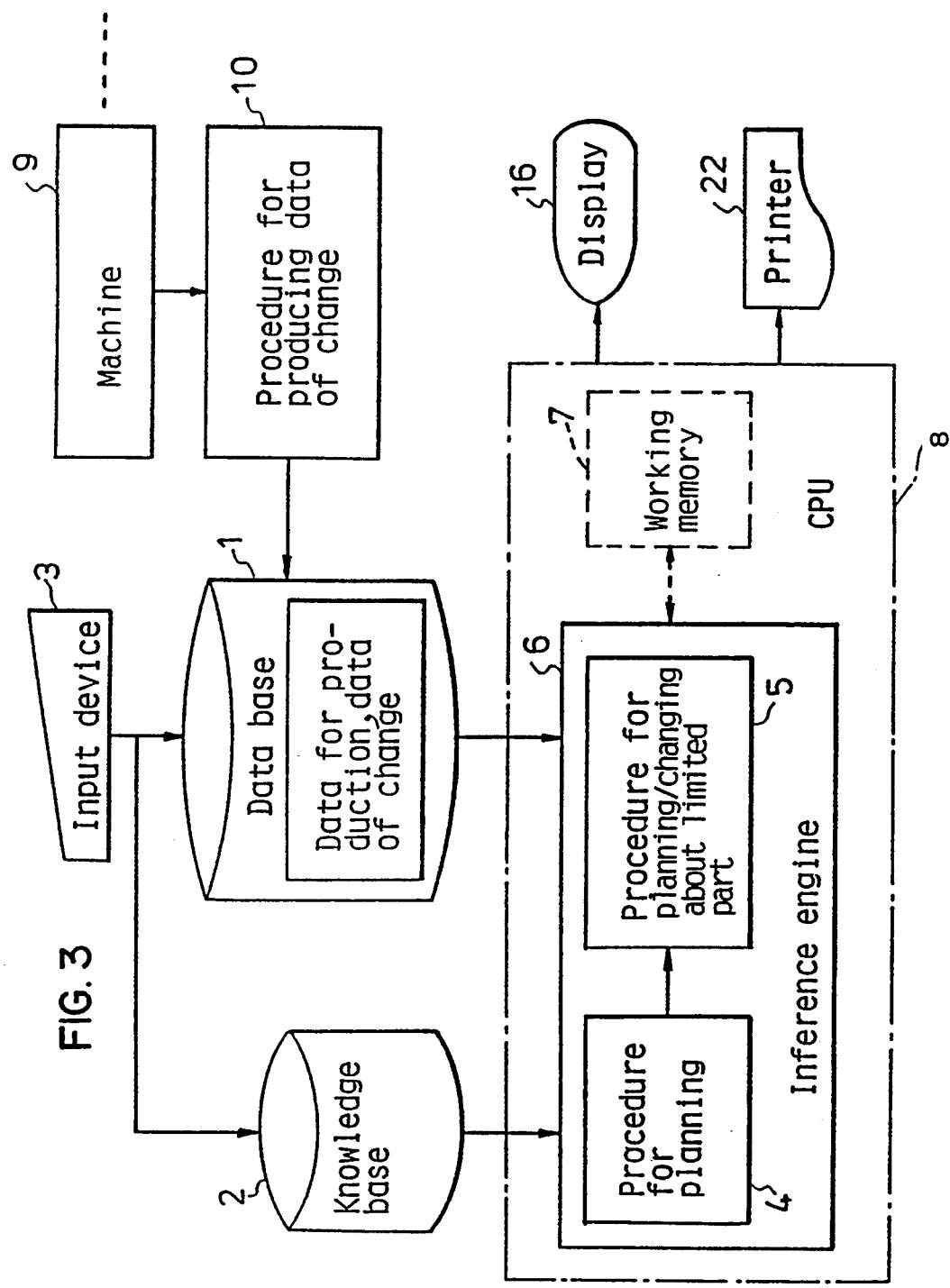
FIG. 3 shows a block diagram of a third embodiment of the present invention.

FIG. 3 shows a block diagram of an inference planning system which is a third embodiment of the invention. Corresponding parts and components to the first embodiment are shown by the same numerals and marks, and the description thereon made in the first embodiment similarly apply. Differences and features of this third embodiment from the first embodiment are as follows.

In FIG. 3, in a procedure 10, data of produced results (output) and/or data representing the state of operation of the facilities such as trouble in the machine 9 are automatically collected and stores these data in the data base 1 as data for changing the producting plan. The above-mentioned data of production and facilities collected from the machines 9 by the procedure 10, such as a result of production or period for disabling operation of facility, are stored in the data base 1 in FIG. 3. The concrete form of the data to be stored is shown in FIGS. 14 and 15. FIG. 14 shows the data indicating the period for disabling operation of each facility, and FIG. 15 shows the data indicating the result of production of each facility. The procedure 5 for planning/changing about a limited part automatically modifies the original planning utilizing the above-mentioned data. Therefore, immediate modification of the production plan is capable on the spot of production, without an operator's input of data such as result of production, and efficient operation of the factory due to the latest production planning is realized.

Figure 4:
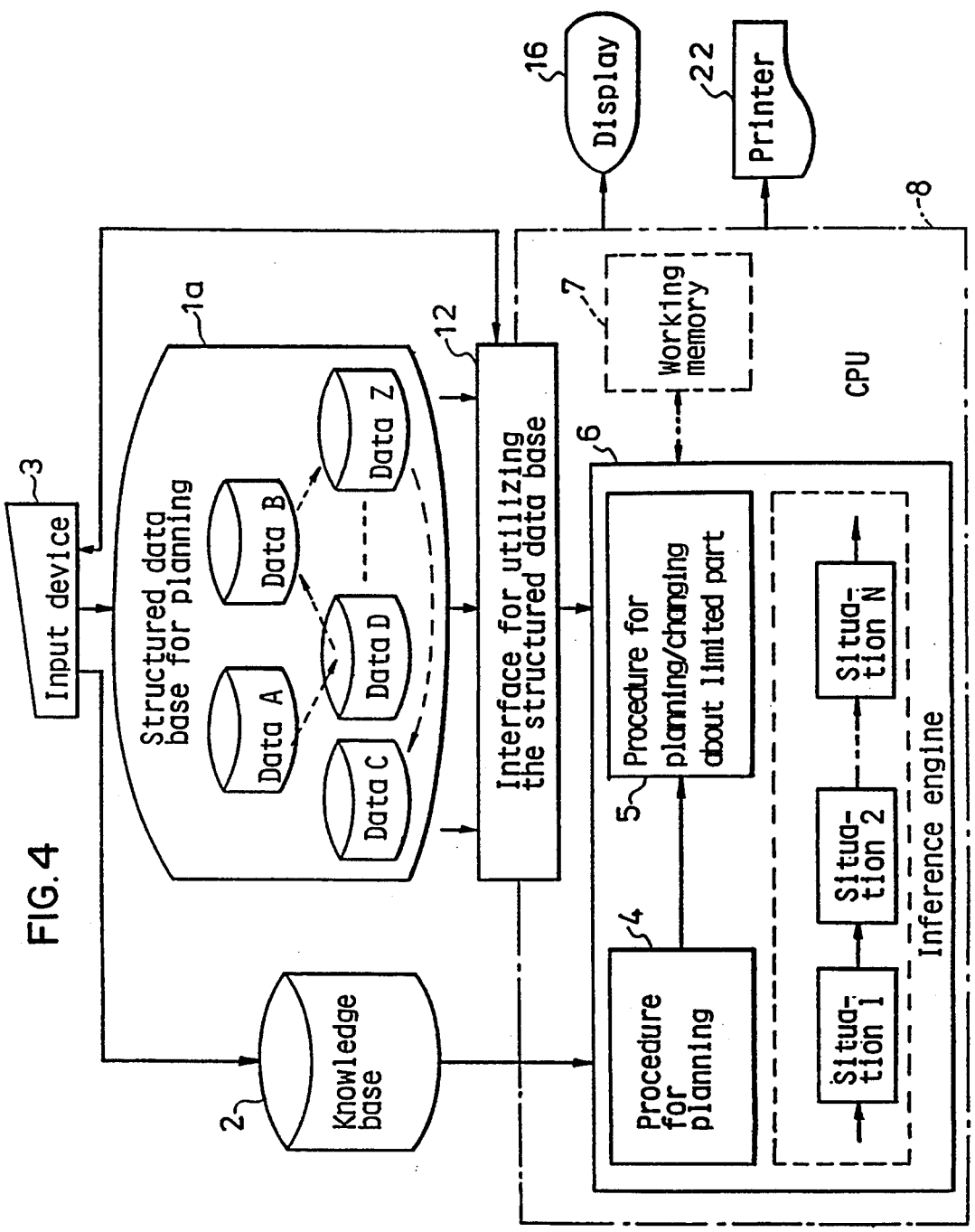
FIG. 4 shows a block diagram of a fourth embodiment of the present invention.

FIG. 4 shows a block diagram of an inference planning system which is a fourth embodiment of the invention. Corresponding parts and components to the first embodiment are shown by the same numerals and marks, and the description thereon made in the first embodiment similarly apply. Differences and features of this fourth embodiment from the first embodiment are as follows. An interface 12 for utilizing a structured data base 1a for planning is described with reference to the accompanying figures. The structured data base 1a has data base index 78 (shown in FIG. 23) which indicates a relation among the data. When one of the data 23-27 is changed by the planner, other data which are influenced by the change of this data are automatically searched. The search operation is performed on the basis of the data base index 78. The interface 12 keeps coordination with the structured data base 1a for planning and provides necessary data to the inference engine 6 on each situation of the planning. In FIG. 4, the structured data base 1a for planning which has structured data 23 to 27 is shown in more detail. The structure of the structured data base 1a is input by the input device 3.

Figure 23:
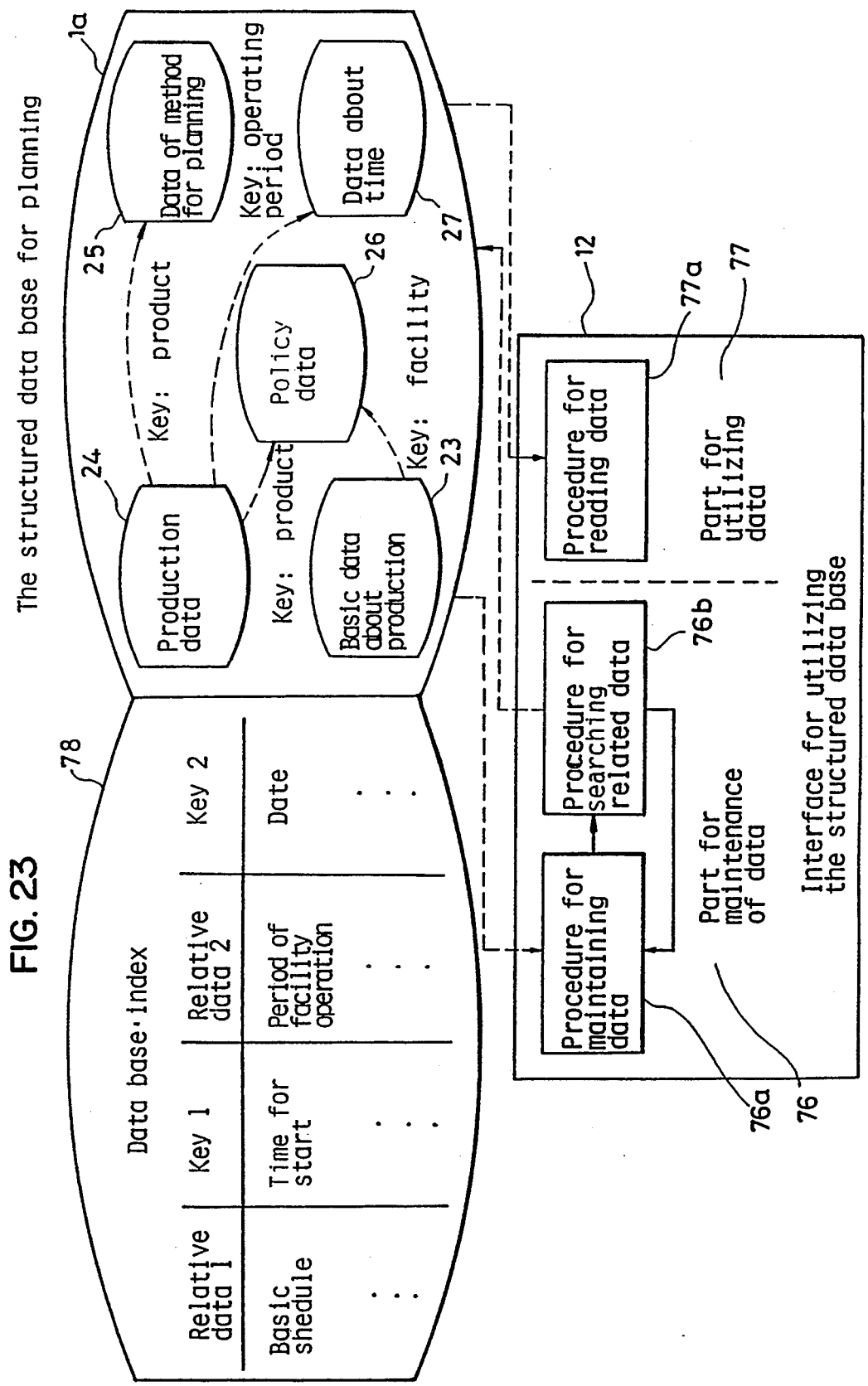
FIG. 23 shows flow of data and process in the interface of FIG. 4.

FIG. 23 shows flow of data and process in the interface 12 for utilizing the data base. The interface 12 comprises part 76 for maintenance of data and includes both procedure 76a for maintaining data and procedure 76b for searching related data. The interface 12 also includes part 77 for utilizing data and includes procedure 77a for reading data. The data base index 78 retains the relation of the structured data base 1a and the format thereof. This relation and format of the structured data base are input by the input device 3. The data 23 to 27 are first modified by the procedure 76a for maintaining data, and data which are related to the modified data are searched through the data base index 78 by the procedure 76b. The searched data also are modified by feedback to the procedure 76a for maintaining data. For example, in the case that the basic schedule shown in FIG. 12 is added as the production data 24, and if either the time for start or the time for completion of the schedule is not set in the time schedule of daily period of facility operation in FIG. 13 as the data 27 about time, the interface 12 adds the additional schedule of daily facility operation and re-constructs the structured data base 1a in proper coordination. The procedure 77a for reading data provides necessary data to the inference engine 6. Namely, the procedure 77a is a program which makes access to the structured data base 1a and provides necessary data in the format retained in the data base index 78 to the inference engine 6. The data base index 78 retains the name of each file which stores the data 23 to 27, the name of the item in each file, and the quantity of bytes of each file as length of file.

Figure 5:
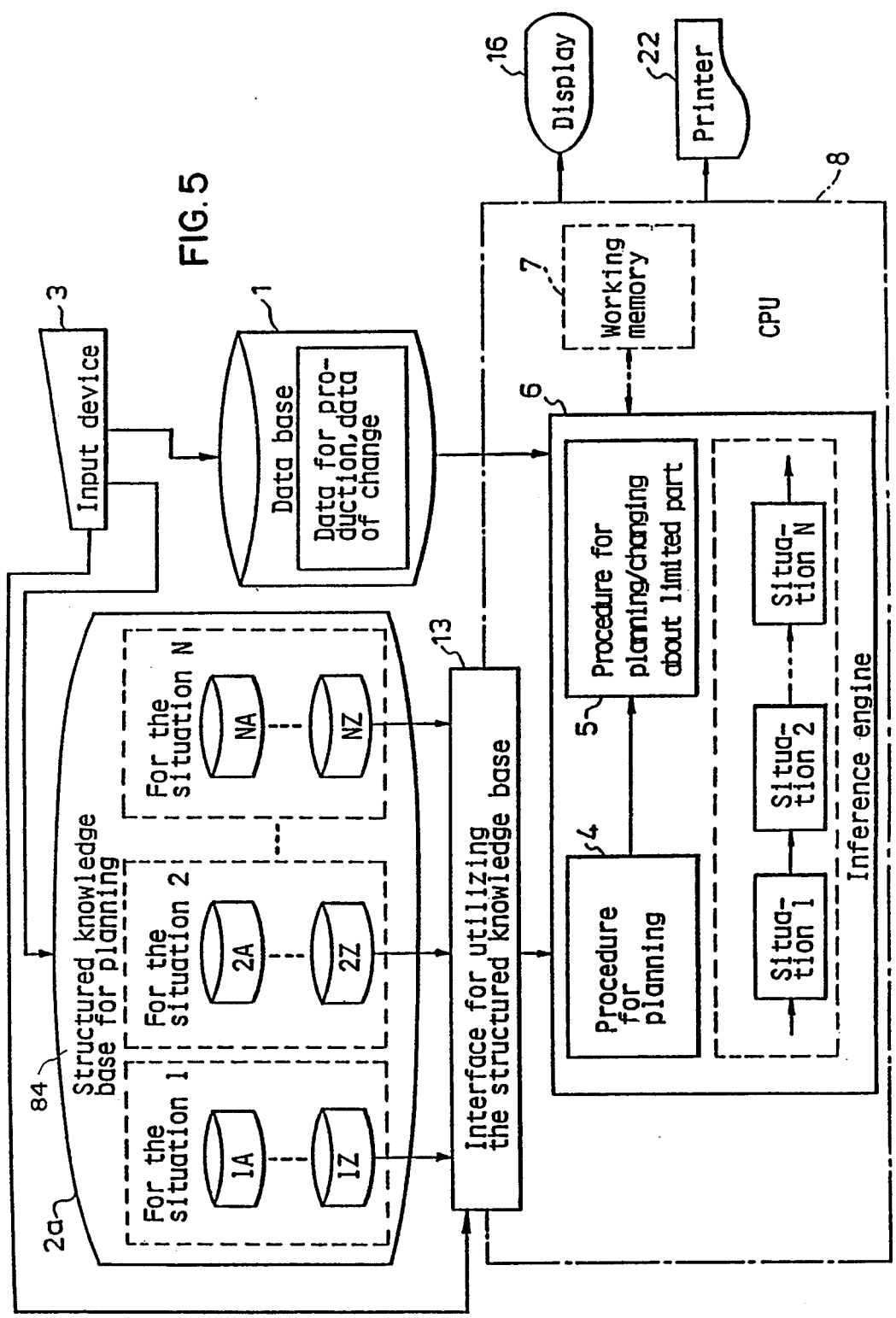
FIG. 5 shows a block diagram of a fifth embodiment of the present invention.

FIG. 5 shows a block diagram of an inference planning system which is fifth embodiment of the invention. Corresponding parts and components to the first embodiment are shown by the same numerals and marks, and the description thereon made in the first embodiment similarly apply. Differences and features of this fifth embodiment from the first embodiment are as follows. An interface 13 for utilizing a structured knowledge base 2a is described with reference to the accompanying figures. The structured knowledge base 2a has knowledge base index 84 (shown in FIG. 24), which indicates situations in which corresponding knowledge is used and specification thereof. The interface 13 maintains the structure of the structured knowledge base 2a and provides necessary knowledge to the inference engine 6 on each situation of the planning, The structured knowledge base 2a stores necessary knowledge as shown in FIG. 20(B), for example. The structure of the structured knowledge base 2a is input by the input device 3.

Figure 24:
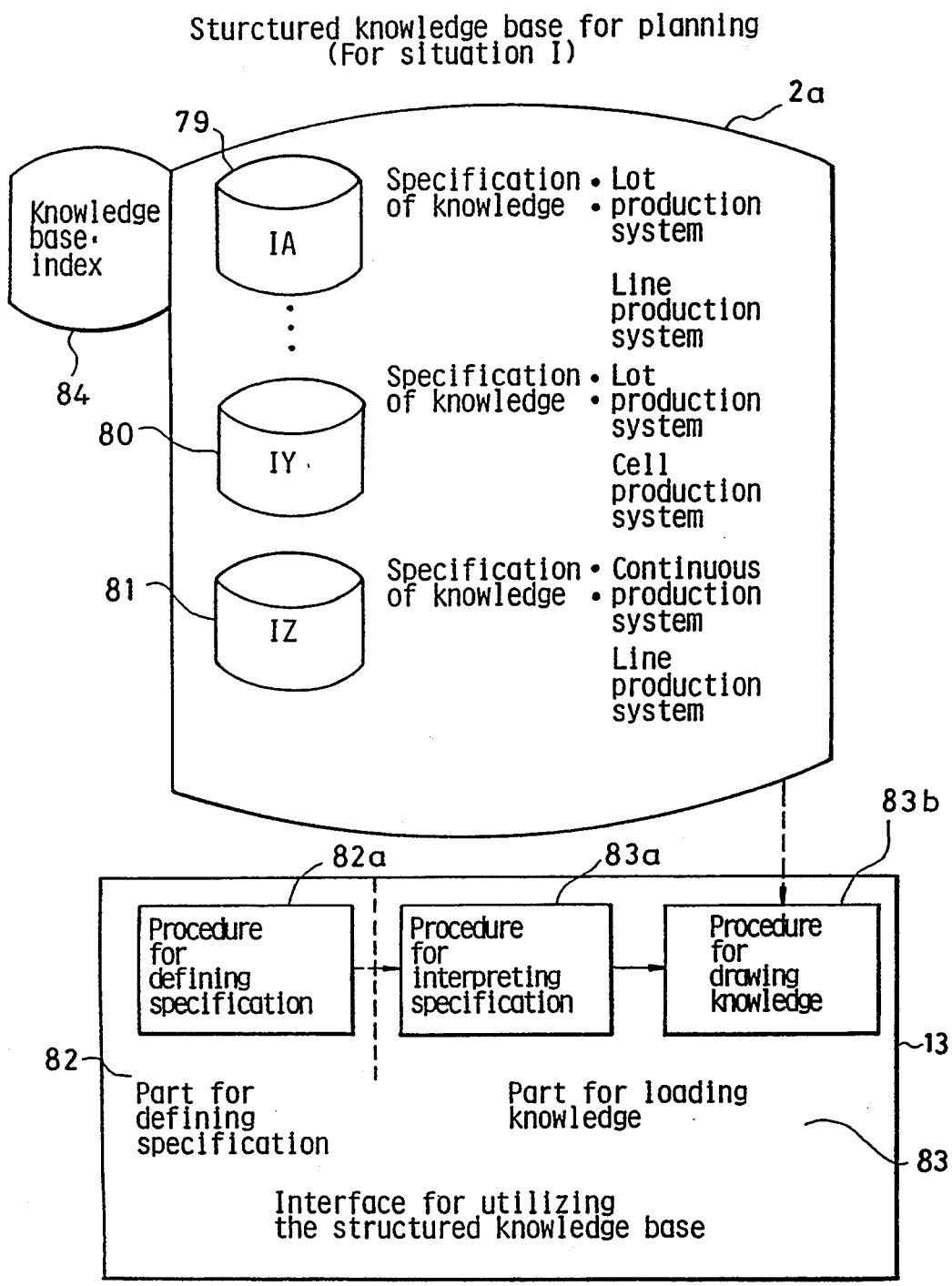
FIG. 24 shows flow of data and process in the interface of FIG. 5.

FIG. 24 shows flow of data and process in the interface 13 for utilizing the structured knowledge base 2a. The interface 13 comprises part 82 for defining specification including procedure 82a for defining specification and a part 83 for loading knowledge including both procedure 83a for interpreting specification and procedure 83b for drawing knowledge. The knowledge base index retains situation and specification in data which each knowledge is to be utilized. The situation data includes classification of work, such as developing manufacturing processing in the step 29 or calculating reference value in the step 30 and so on, and classification of production such as lot production system or line production system. In accordance with the knowledge base index 84 the inference engine 6 can select knowledge in the structured knowledge base 2a. In the part 82 for defining specification, the procedure 82a for defining specification institutes a situation and/or specification for utilizing each knowledge and registers them to the knowledge base index 84. In the part 83 for loading knowledge, at first, the procedure 83a for interpreting specification interprets data in the knowledge base index 84 and selects knowledge data which is in accordance with a planning specification. The procedure 83b draws knowledge and provides it to the inference engine 6 in every situation with progression of the inference.

As matter of course, in accordance with the progress of situation, unnecessary knowledge is released from the inference engine 6 and necessary knowledge is provided continuously one by one. Some examples of knowledge are shown in FIG. 20. Knowledge shown in FIG. 20 (A) is a "Meta rule" and it is always provided to the inference for developing situation. Knowledge shown in FIG. 20(B) is a "Dispatching standard" for selecting lot, and knowledge shown in FIG. 20(C) is a "Johnson algorithm" which is one of method of "Operations research" as a mathematical method. The two knowledge "Dispatching standard" and "Johnson algorithm" are provided on situation of the step 31 for allotting each operation to facility. Knowledge shown in FIG. 20(D) is a standard for dividing a lot in rule format which is provided on situation of step 30 in FIG. 10(a) and 10(b) for calculating a standard value.

Figure 6:
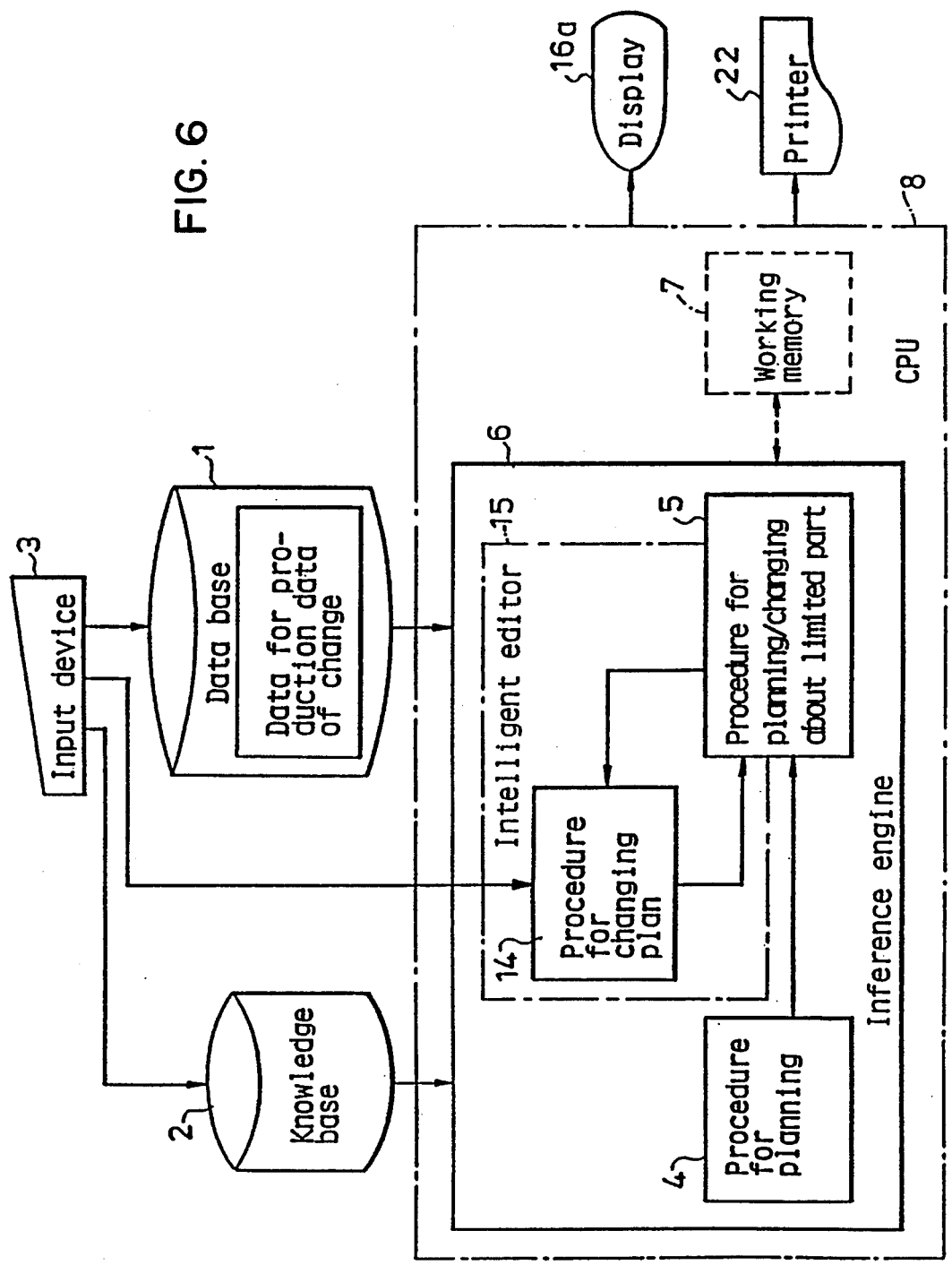
FIG. 6 shows a block diagram of a sixth embodiment of the present invention.

FIG. 6 shows a block diagram of an inference planning system which is a sixth embodiment of the invention. Corresponding parts and components to the first embodiment are shown by the same numerals and marks, and the description thereon made in the first embodiment similarly apply. Differences and features of this sixth embodiment from the first embodiment are as follows. In the above-mentioned embodiments, the inference engine 6 makes planning automatically. In this embodiment, however, planner's interaction with the inference engine 6 provides the planning. An intelligent editor 15 automatically and interactively modifies the plan through an input/display device 16a utilizing both the procedure 14 for changing the plan which sets up data of change 28 and the procedure 5 for planning/changing about the limited part. Input can be done by either the input device 3 or the input/display device 16a.

Figure 25:
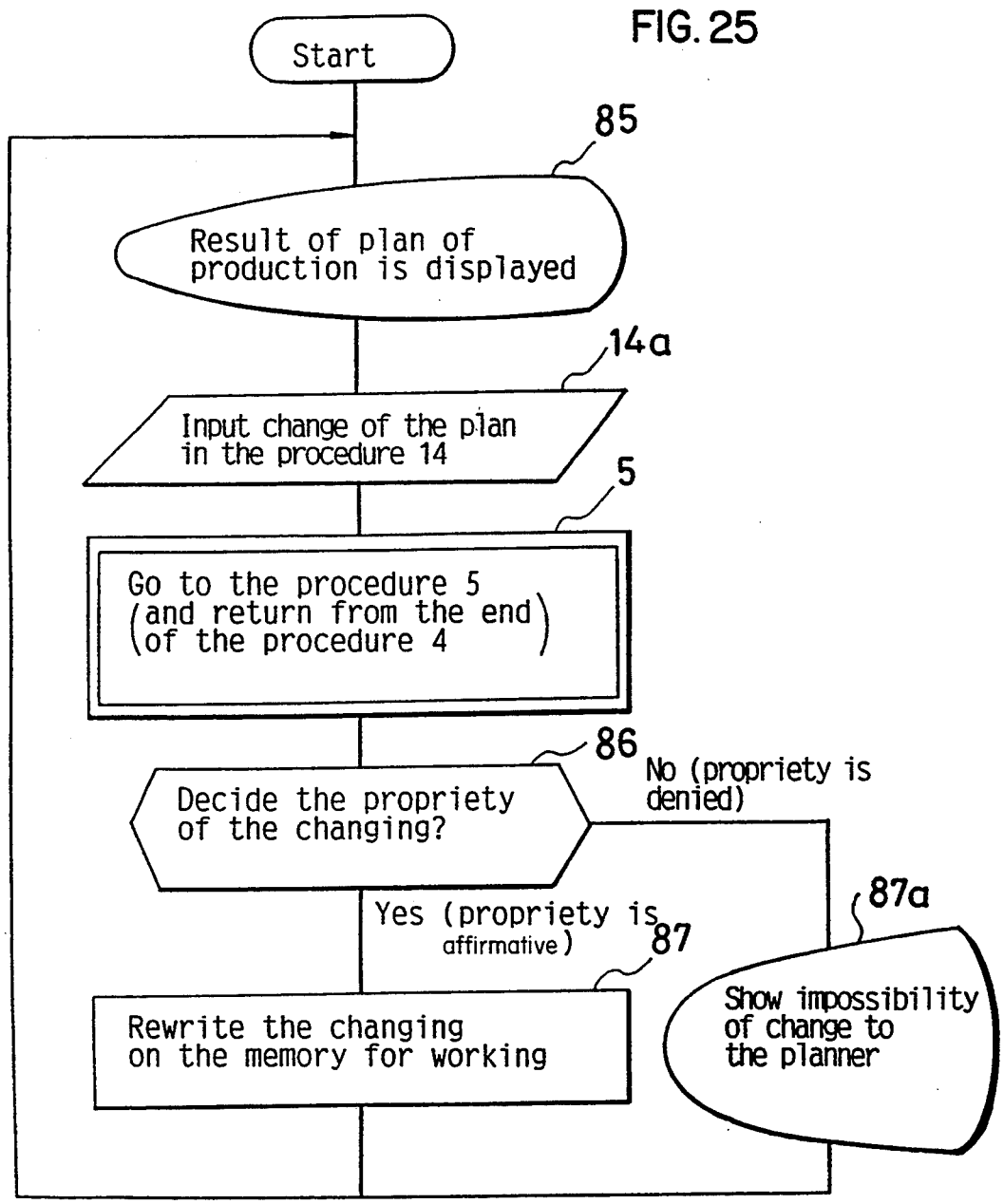
FIG. 25 shows a flow chart of process in the intelligent editor of FIG. 6.
Figure 26:
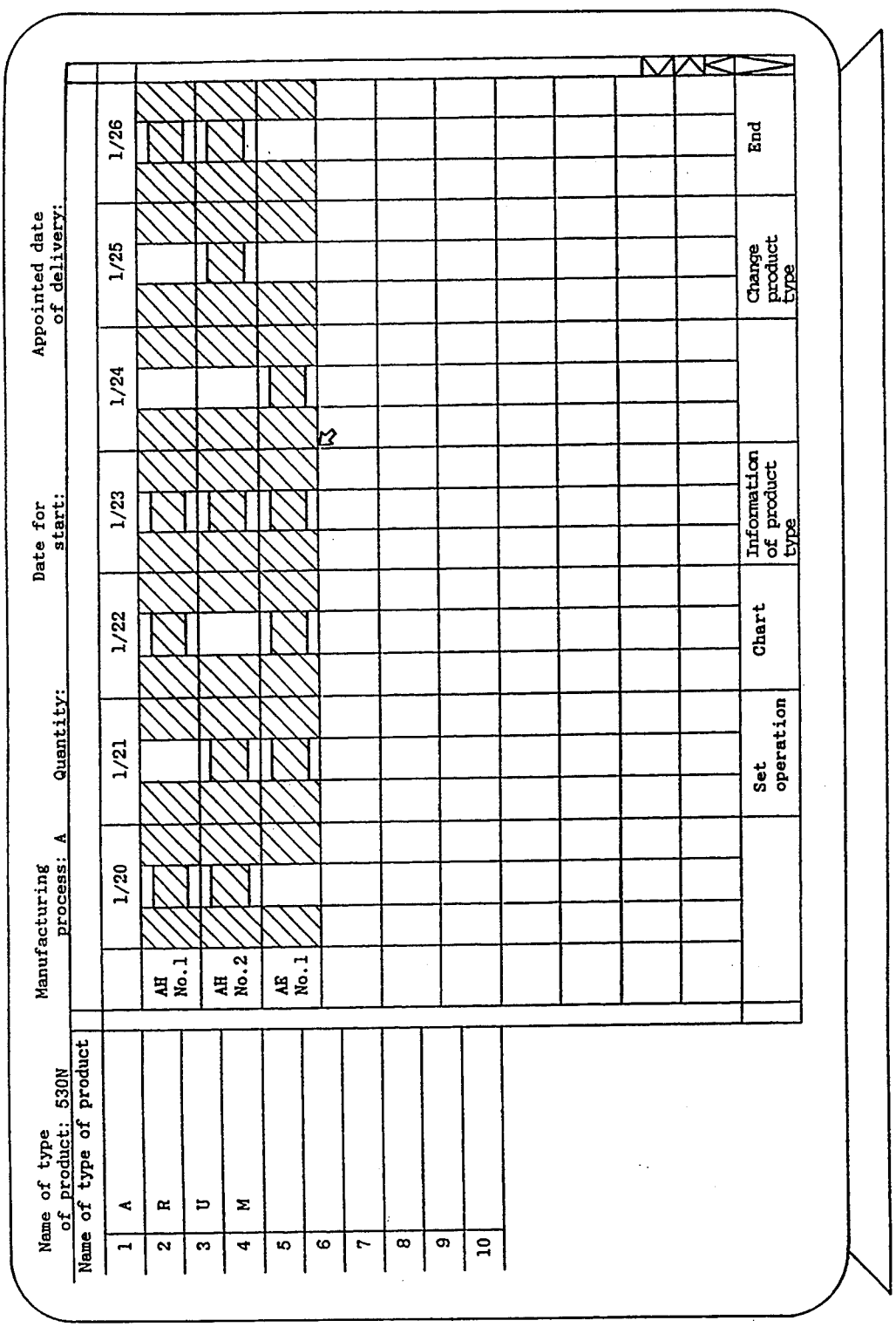
FIG. 26 shows an example of daily production planning which is input by a planner.

The intelligent editor 15 which is constructed as a function of the inference engine 6 is described with reference to the accompanying FIG. 6, FIG. 25, FIG. 26 and FIG. 27. FIG. 25 shows a flow chart of the process of the intelligent editor 15. In step 85, result of the latest production plan in the working memory 7 is displayed on the input/display device 16a. In step 14a, the planner inputs the change of the plan in the procedure 14 by the input/display device 16a. Some examples of the display are shown in FIGS. 26 and 27. In FIG. 26, a planner inputs a daily production plan from January 20 (1/20) to January 26 (1/26) to the facilities named AH No.1 to AE No.1 as to the type of products named 530N through an arrow indicated on the display. The arrow is moved through a pointing device such as a mouse. In FIG. 27, the planner temporarily refers to another production planning as to another type of product (on the same display). In the step 5a. the flow is connected to the procedure 5 for planning/changing about the limited part. Namely, in the procedure 5, the limited part which is influenced by the change is automatically searched in the inference engine 6, and is modified in a similar manner described in the first embodiment. In the step 86, a contradiction due to changing such as the order of process in the same lot is searched, and propriety of the intended change is decided. The contradiction can be such that the start time of the first manufacturing process is later than the start time of the second manufacturing process In case "Yes" no contradiction is found so that propriety exists. In the step 87, the working memory 7, which professionally retains result of planning, is updated In case "No" contradiction is found, so that propriety does not exist, and the process returns to the step 85. The above mentioned flow is repeated until there becomes no part for changing.

Figure 7:
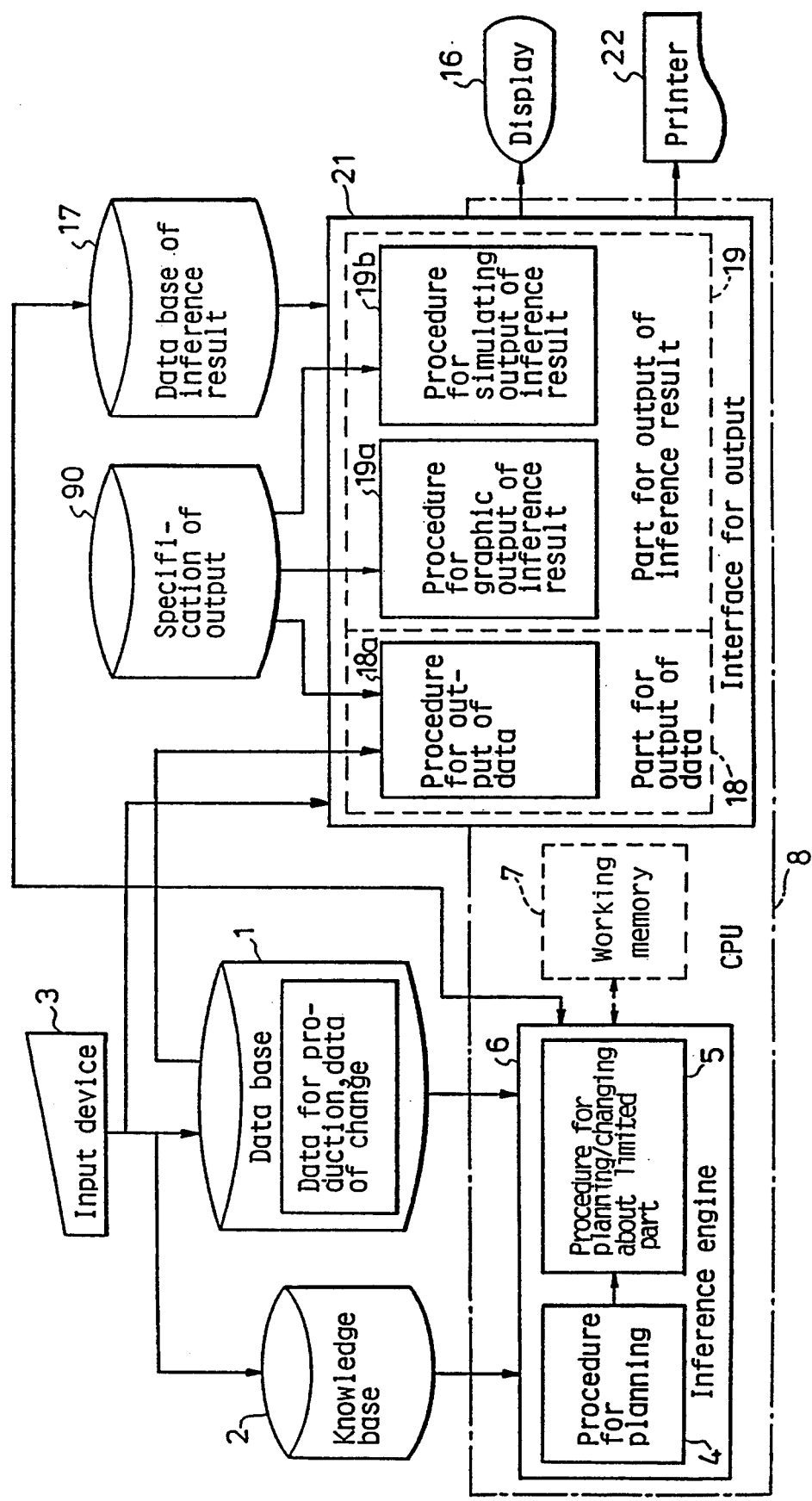
FIG. 7 shows a block diagram of a seventh embodiment of the present invention.
Figure 28A:
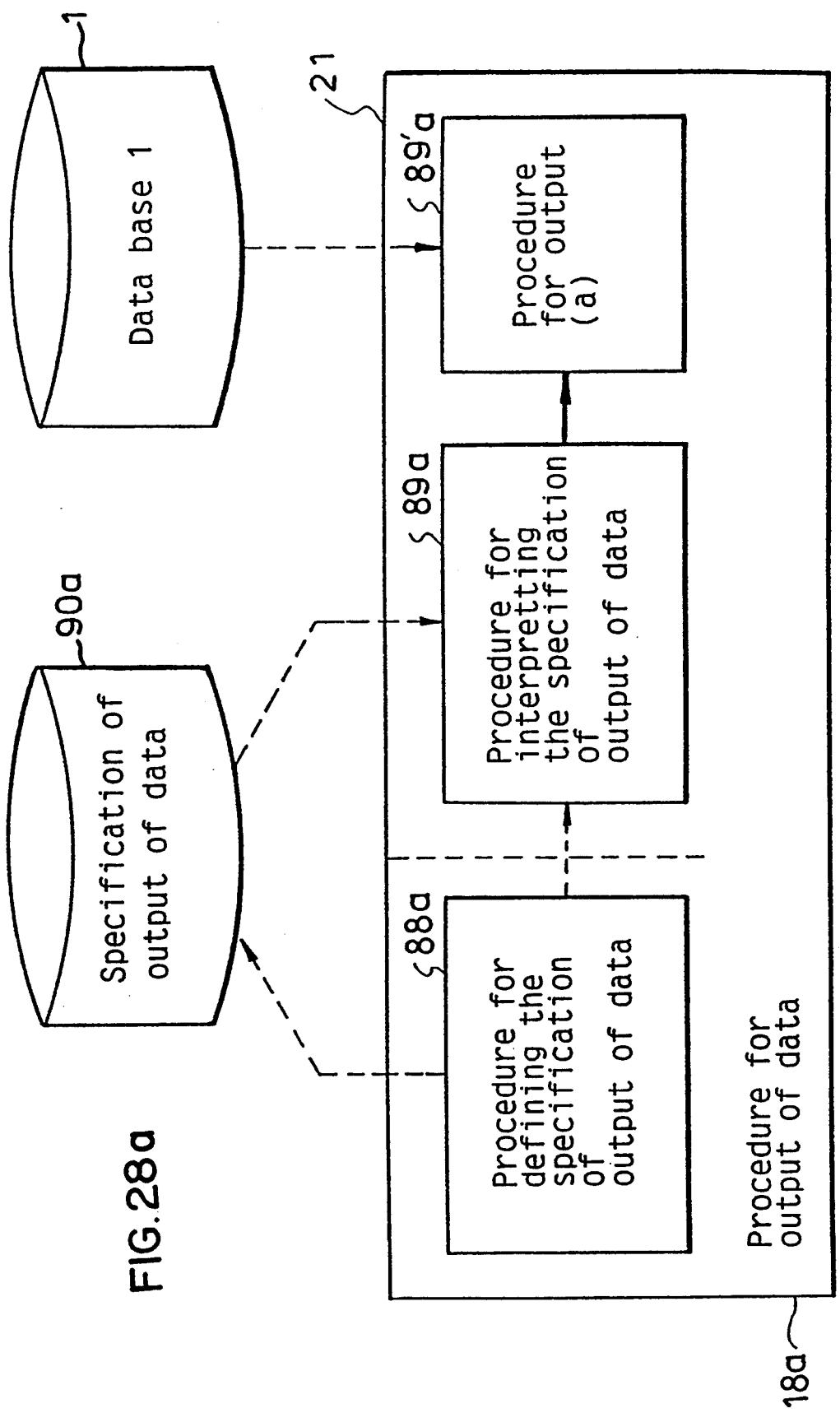
FIG. 28(a) shows flow of data and process in the procedure for output of data in FIG. 7.
Figure 28B:
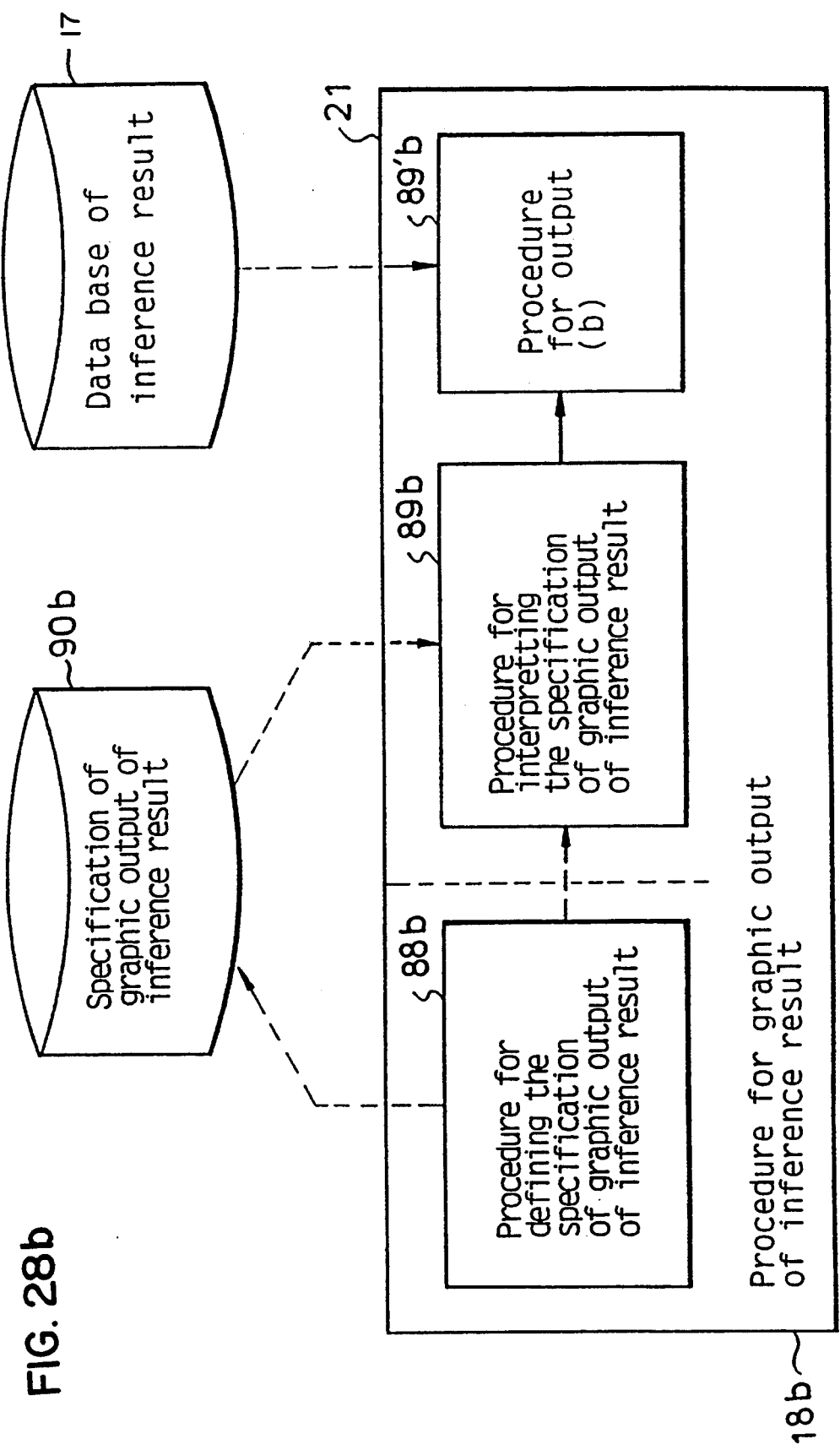
FIG. 28(b) shows flow of data and process in the procedure for graphic output of inference result in FIG. 7.
Figure 28C:
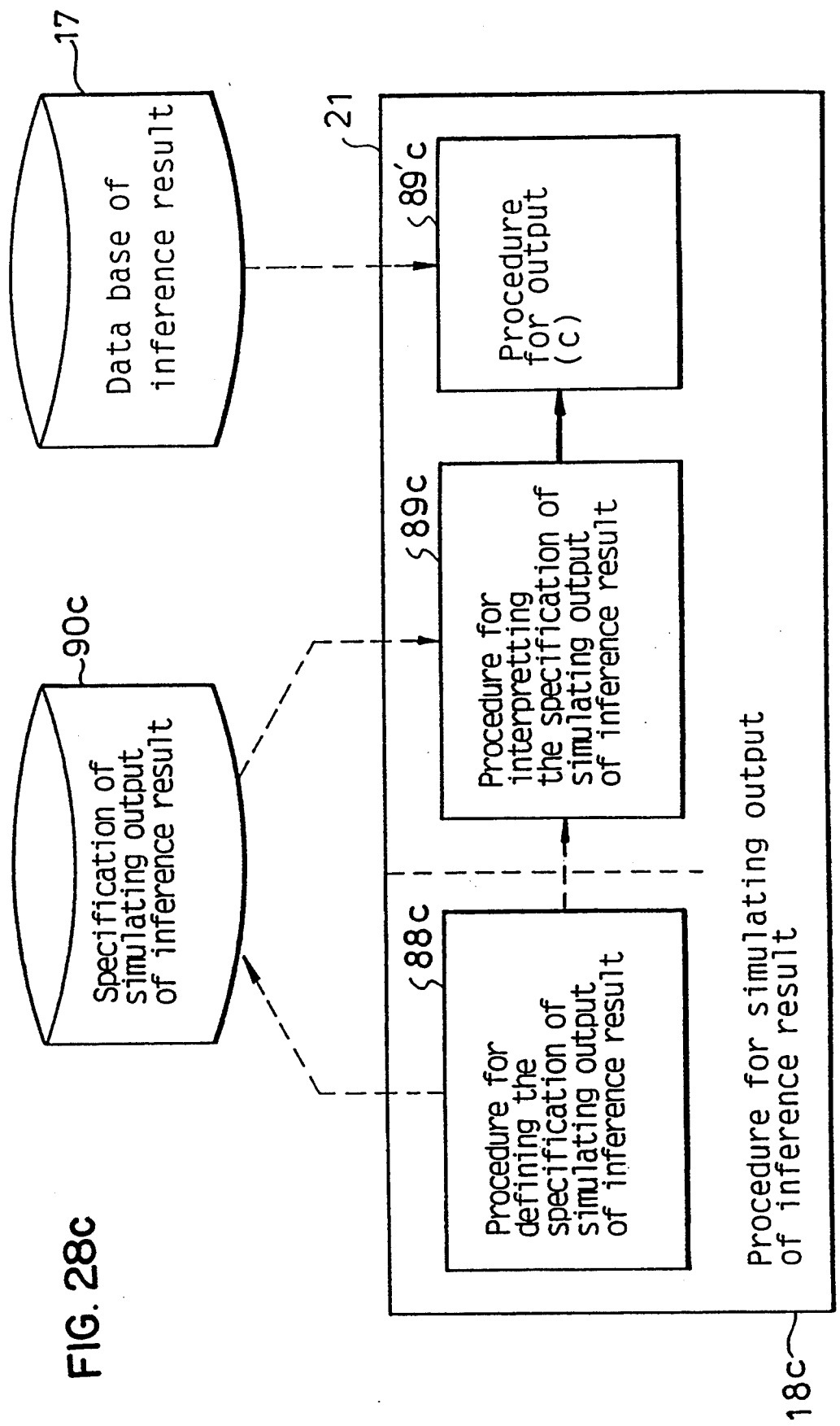
FIG. 28(c) shows flow of data and process in the procedure for simulating the output of inference result in FIG. 7.

FIG. 7 shows block diagrams of an inference planning system which is a seventh embodiment of the invention. Corresponding parts and components to the first embodiment are shown by the same numerals and marks, and the description thereon made in the first embodiment similarly apply. Differences and features of this seventh embodiment from the first embodiment are as follows. In this embodiment, the format which displays data of the data base 1 and the inference results scheduled by the inference engine 6 can be changed in accordance with requirement of the user. An interface 21 for output of data is described with reference to the accompanying FIG. 7, 28(a), 28(b) and 28(c). A data base 17 of inference result'stores result of planning. Specification 90 of output of data is input by the input device 3. The specification 90 is stored in a data base of the specification. In FIGS. 28(a), 28(b) and 28(c), the data base of the specification is abbreviated. In FIG. 7, the interface 21 comprises part 18 for output of data including procedure 18a for output of data in database 1 and part 19 for output of inference result data in the data base of inference result, the part 19 including both procedure 19a for graphic output of inference result and procedure 19b for simulating an output of inference result. The procedure 18a for output of data, the procedure 19a for graphic output of inference result, and the procedure 19b for simulating output of inference result are shown in FIG. 28(a), FIG. 28(b) and FIG. 28(c) respectively.

FIG. 28(a) shows flow of data and process in the procedure 18a for output of data. In FIG. 28(a), the procedure 18a for output of data comprises a procedure 88a for defining the specification of output of data, a procedure 89a for interpreting the specification of output of data and a procedure 89'a for output (a) (described below). Specification 90 of output, which includes formats of output such as specification 90a of output of data, specification 90b of graphic output of inference result and specification 90c of simulating output, is input by the input device 3. The procedure 88a for defining the specification of output sets up the specification 90a of output of data. The procedure 89a for interpreting the specification of output of data interprets the specification 90a of output of data. The procedure 89'a (1) constructs a format of output from the interpreted specification 90a, (2) selects necessary data from the data base 1, (3) combines the necessary data with the constructed format of output and (4) outputs as output data (a) the data combined with the format to the printer 22 or the display 16.

FIG. 28(b) shows a flow chart of data and process in the procedure 18b for graphic output of inference result. In FIG. 28(b), the procedure 18b for graphic output of inference result comprises a procedure 88b for defining the specification of graphic output of inference result, a procedure 89b for interpreting the specification of graphic output of inference result and a procedure 89'b for output (b) (described below). The procedure 88b for defining the specification of graphic output of inference result sets up the specification 90b. The procedure 89b interprets the specification 90b. The procedure 89'b performs the following steps:

(1) constructs a format of output from the interpreted specification 90b; (2) selects necessary data from the data base 17 of inference result; (3) combines the necessary data with the constructed format of output; and (4) outputs the data combined with the format to the printer 22 or the display 16.

FIG. 28(c) shows flow chart of data and process in the procedure 18c for simulating the output of inference result. In FIG. 28(c) the procedure 18c comprises a procedure 88c for defining the specification of simulating output of inference result, a procedure 89c for interpreting the specification of simulating output of inference result and a procedure 89'c for output (c). The procedure 88c sets up the specification 90c. The procedure 89c interpret the specification 90c. The procedure 89'c: (1) constructs a format of output from the interpreted specification 90c; (2) selects necessary data from the data base 17 of inference result; (3) combines the necessary data with the constructed format of output; and (4) outputs the data combined with the format to the printer 22 or the display 16.

Figure 32:
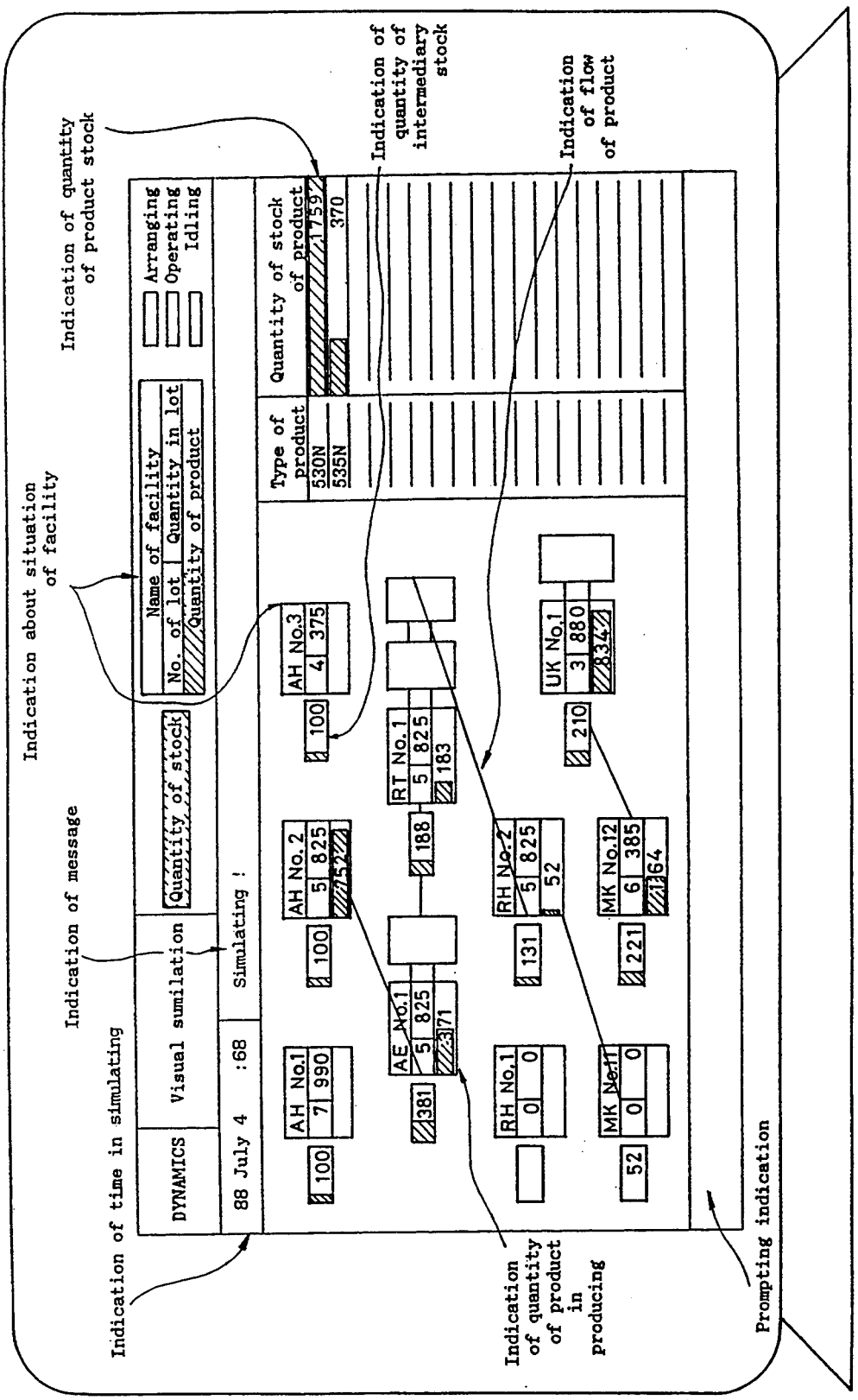
FIG. 32 shows a flow diagram as an example of graphic output.
Figure 33:
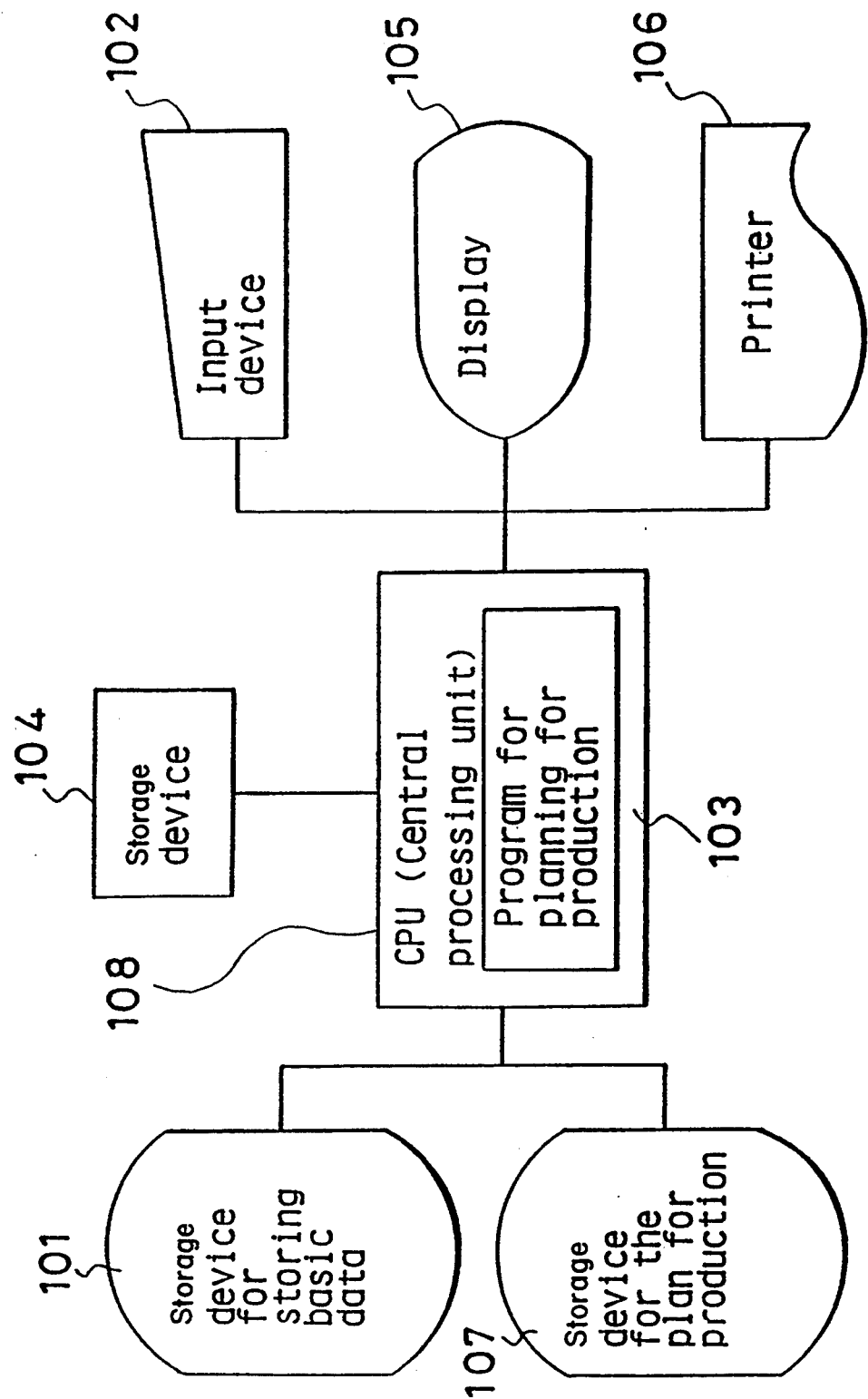
FIG. 33 shows a schematic block diagram of the conventional prior art planning system for production.

The specification 90 of output has data about the established layout of letters, lines, and so on. FIGS. 29 to 31 show some examples obtained by the procedure 19a, as described in FIG. 7, for graphic output of an inference result. FIG. 29 shows a production plan on July 3, in "Gantt chart" format. FIG. 30 shows data of rate of facility operation of the facility RTNo.1 from July 1, to July 9. FIG. 31 shows the intermediary stock on producing of the facility RT No.1. FIG. 32 shows an example of the inference result which is output by the procedure 19b, described in FIG. 7, for simulating output thereof, which shows production at 68 minute July 4, in an animation form. On these displays, layout of letters and lines or the layout of facility such as the facility AH No.1 in FIG. 32 can be changed by inputting the corresponding part of the specification 90.

Figure 8A:
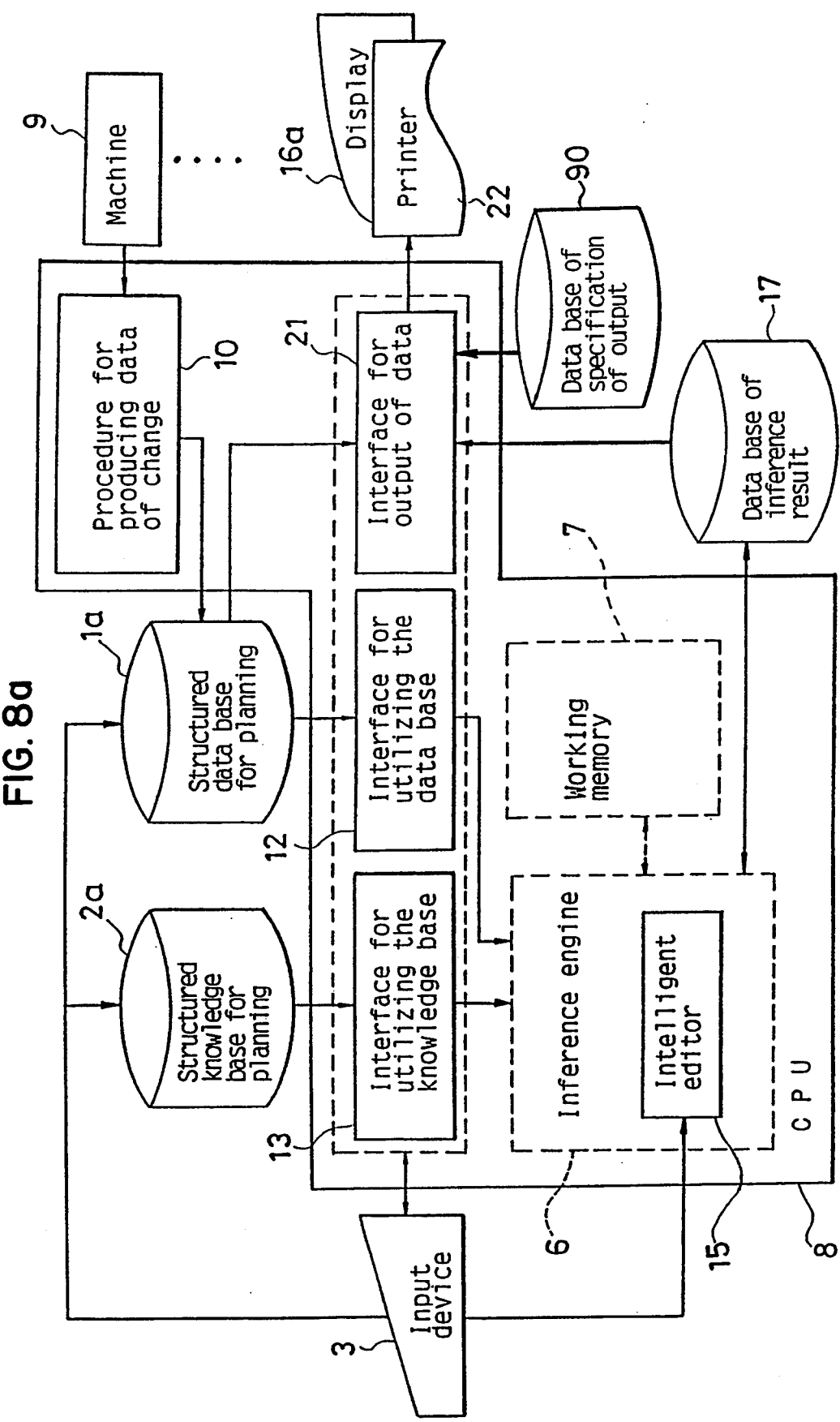
FIG. 8(a) shows a block diagram of an eighth embodiment of the present invention.

FIG. 8(a) shows a basic block diagram of an inference planning system which is an eighth embodiment of the invention. Corresponding parts and components to the first embodiment are shown by the same numerals and marks, and the description thereon made in the first embodiment similarly apply. Differences and features of this eighth embodiment from the first embodiment are as follows.

The eighth embodiment includes all features of the above-mentioned embodiments. Namely, the inference planning system of the present embodiment includes at least the first embodiment of the present invention. Numeral 9 designates at least more than one machine. Numeral 10 designates a procedure for producing data due to change. Numeral 1a designates the structured data base for planning. Numeral 12 designates the interface for utilizing the structured data base 1a for planning. Numeral 2a designates the structured knowledge base for planning. Numeral 13 designates the interface for utilizing the structured knowledge base 2a. Numeral 6 designates the inference engine. Numeral 15 designates the intelligent editor. Numeral 7 designates the working memory. Numeral 17 designates the data base of inference result. Numeral 3 designates an input device. Numeral 22 designates the printer. Numeral 16a designates the input device display. Numeral 21 designates the interface for output of data. Numeral 8 designates the CPU (central processing unit) for controlling the above-mentioned the subsystem comprising the procedure 10 for producing data due to change, the structured data base 1a for structured planning, the interface 12 for utilizing the structured data base 1a, the structured knowledge base 2a for planning, the interface 13 for utilizing the structured knowledge base 2a, the inference engine 6, the intelligent editor 15, the working memory 7, the data base 17 of inference result, the input device 3, the printer 22, the input device display 16 and the interface 21 for output of data.

The inference planning system shown in FIG. 8(a) performs the following functions. (1) The structured data base 1a and the structured knowledge base 2a for planning are constructed by data which are input by the input device 3. Some of the data for the structured data base 1a are collected by the machining center 9. (2) The planning is automatically made though the inference engine 8 which utilizes the structured data base 1a through the interface 12, the structured knowledge base 2a through the interface 13 and the working memory 7, simultaneously performing reconstruction of the structured knowledge base 2 as occasion demands. (3) The results of the planning which are transferred from the working memory 7 to the data base 17 of the inference results are displayed on the input device display 16 or printed by the printer 22 through the interface 21 for output of data. (4) Concerning changes in the plan, any modification by a user is done interactively through intelligent editor 15.

FIG. 8(b) shows a block diagram of hardware realizing the basic block diagram shown in FIG. 8(a). As a matter of course, the other embodiments use a similar block diagram of hardware. In FIG. 8(b), numeral 8a designates read only memory (ROM) which retains the subsystem 10, the interface 12, the interface 13, the inference engine 8, the intelligent editor 15, and the interface 21. Numeral 8b designates random access memory which is used as the working memory 7. Numeral 8c designates an external memory which stores the structured data base 1a, the structured knowledge base 2a, specification of output and data base 17 (for inference result). Numeral 8d designates a communication interface for communication with the machine 9. The input device 3 and the input device/display 16 is combined together in FIG. 8(b).

The present invention is described through the embodiments primarily for planning in manufacturing. These embodiments enable immediate and accurate modification on a daily basis of a plan due to changing of the production plan. For instance, when even skilled planner using a conventional device makes a production planning of manufacturing wherein many facilities are used for making many different types of products, it takes more than a week to make the plan. Furthermore, it is impossible to follow up unforeseen changes of the plan. In the present invention, only a few hours are needed to make a plan for a planner. Moreover, modifications due to change of plan can be made in a moment.

While specific embodiments of the invention have been illustrated and described herein, it is realized that modifications and changes will occur to those skilled in the art. It is therefore to be understood that the appended claims are intended to cover all modifications and changes as fall within the true spirit and scope of the invention.

What is claimed is:

1. A method of performing inference planning comprising the steps of:
   storing, in a data base storing means, production planning data of a production plan and data for changing said production planning data;
   storing, in a knowledge base storing means, data of procedures which are necessary to make said production plan and to change said production plan and are expressed by a rule type format;
   inputting said production planning data and said data for changing said production planning data into said data base storing means;
   inputting said data of procedures into said knowledge base storing means;
   producing said production plan in accordance with said production planning data and said data of procedures, by following the steps of:
   developing a plan of a manufacturing process,
   calculating a reference value,
   allocating an operation period to a facility in which the manufacturing process will be carried out, and
   calculating an estimation value,
   wherein a limited part of said plan may be planned and changed by the steps of:
   searching a part of said plan which is influenced by the data of change,
   deleting said part for changing, and
   returning a new plan to first processing means for planning,
   temporarily storing said production plan produced by a central processing unit, and
   outputting said production plan.

2. The method of inference planning of claim 1, wherein said method further comprises the steps of:
   estimating whether results of inference stored in working memory can function as said production plan without a predetermined level of inconvenience; and
   reconstructing said knowledge base storing means when an estimating means estimates that said results of inference cannot function without said inconvenience.

3. The method of inference planning of claim 1, wherein said method further comprises the steps of:
   collecting production results data and facilities state data, said facilities state data representing operations of existing production facilities;
   formatting and storing said production results data and said facilities state data into said data base storing means; and
   changing said production plan in accordance with said stored production results data and said facilities state data.

4. The method of inference planning of claim 1, wherein said method further comprises the step of utilizing said data base by the steps of:
   reconstructing said data base storing means as a structured data base, said structured database maintaining a relation between said planning data stored in said data base storing means and planning data input by an input device; and
   providing data from said data base storing means to an inference engine.

5. The method of inference planning of claim 1, wherein said method further comprises utilizing said knowledge base by the steps of:
   constructing data input into said knowledge base storing means from an input device to form a structured knowledge base for planning; and
   providing knowledge from said knowledge base storing means to an inference engine in accordance with a planning situation.

6. The method of inference planning of claim 1, wherein said method further comprises the steps of:

changing said production plan in response to said changing data input by an input device; and searching and modifying a limited part of results of said inference, said limited part being affected by said input changing data.

7. The method of inference planning of claim 1, wherein said method further comprises the steps of:

storing results of said inference from a working memory in an inference result data base; and interfacing with said data base, said step of interfacing comprising the steps of:

outputting data from said data base in accordance with data input from an input device, providing a graphic output of said results of said inference from said inference result data base, said graphic output being provided in accordance with said data input from said input device, and simulating said results of inference data from said inference result data base in accordance with said data input from said input device.

* * * * *